(12) United States Patent
Tsujimoto

(10) Patent No.: US 8,397,277 B2
(45) Date of Patent: Mar. 12, 2013

(54) MULTI-FUNCTIONAL PERIPHERAL, AUTHENTICATION SERVER AND SYSTEM

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 309 days.

(21) Appl. No.: 12/825,731

(22) Filed: Jun. 29, 2010

(65) Prior Publication Data

US 2010/0332823 A1 Dec. 30, 2010

(30) Foreign Application Priority Data

Jun. 30, 2009 (JP) ................................. 2009-155137

(51) Int. Cl.
*H04L 29/06* (2006.01)
(52) U.S. Cl. ............................................. 726/3; 713/155
(58) Field of Classification Search .................. 713/155; 726/3
See application file for complete search history.

(56) References Cited

U.S. PATENT DOCUMENTS

2008/0068647 A1* 3/2008 Isobe et al. ................... 358/1.15
2009/0190153 A1* 7/2009 Nakanishi ..................... 358/1.13
2010/0306690 A1* 12/2010 Yoshida ......................... 715/772
2012/0026549 A1* 2/2012 Tanaka ........................... 358/1.15

FOREIGN PATENT DOCUMENTS

| JP | 2006-115126 | 4/2006 |
|---|---|---|
| JP | 2006-174031 | 6/2006 |
| JP | 2008-273126 | 11/2008 |
| JP | 2009-075451 | 4/2009 |

OTHER PUBLICATIONS

English translation of JP-2009-075451 published Apr. 9, 2009.*

* cited by examiner

*Primary Examiner* — Jeffrey Pwu
*Assistant Examiner* — William Corum, Jr.
(74) *Attorney, Agent, or Firm* — Edwards Wildman Palmer LLP; David G. Conlin; Steven M. Jensen

(57) ABSTRACT

In a multi-functional peripheral capable of performing user authentication processing in cooperation with an authentication server and processing in cooperation with an external application, a user is able to easily access a screen of a previously used function immediately after logging in without necessity of switching a screen of the function of the multi-functional peripheral itself and a screen of the external application function.

14 Claims, 16 Drawing Sheets

| USER ID | LOGIN NAME | PASSWORD |
|---------|------------|----------|
| 1 | User1 | Pass1 |
| 2 | User2 | Pass2 |
| ⋮ | ⋮ | ⋮ |
| N | UserN | PassN |

FIG. 6

| USER ID | COPY FUNCTION | SCAN FUNCTION | FAX FUNCTION | PRINT FUNCTION | DOCUMENT MANAGEMENT APPLICATION FUNCTION |
|---|---|---|---|---|---|
| 1 | VALID | VALID | VALID | VALID | INVALID |
| 2 | VALID | INVALID | VALID | VALID | VALID |
| ... | ... | ... | ... | ... | ... |
| N | VALID | VALID | VALID | VALID | VALID |

| USER ID | COPY FUNCTION | SCAN FUNCTION | FAX FUNCTION | PRINT FUNCTION | DOCUMENT MANAGEMENT APPLICATION FUNCTION | FIRST PRIORITY SCREEN | SECOND PRIORITY SCREEN |
|---|---|---|---|---|---|---|---|
| ... | ... | ... | ... | ... | ... | ... | ... |
| 2 | 8 | 12 | 5 | 2 | 1 | COPY | FAX |
| ... | ... | ... | ... | ... | ... | ... | ... |

VALUE SHOWS NUMBER OF TIMES USED (TIMES)

MULTI-FUNCTIONAL PERIPHERAL, AUTHENTICATION SERVER AND SYSTEM

CROSS-NOTING PARAGRAPH

This non-provisional application claims priority under 35 U.S.C. §119 (a) on Patent Application No. 2009-155137 filed in JAPAN on Jun. 30, 2009, the entire contents of which are hereby incorporated herein by reference.

FIELD OF THE INVENTION

The present invention relates to a multi-functional peripheral capable of performing user authentication processing in cooperation with an authentication server and capable of performing processing in cooperation with an application program (application) that is stored in an external application server, the authentication server, and a system provided with the multi-functional peripheral, the authentication server and the application server.

BACKGROUND OF THE INVENTION

Conventionally, a system has been proposed in which functions of applications which operate on a personal computer (PC) and the function of a multi-functional peripheral are associated with each other, so that the multi-functional peripheral can operate as a part of the total application system. By using the system and loading external authentication/tabulation applications therein, it is also possible to perform uniform management of the accounting functions including authentication/tabulation of the multi-functional peripheral by the server.

Moreover, in a conventional multi-functional peripheral, a default screen (a copy screen etc.) specified by a setting in the multi-functional peripheral is displayed as an initial screen after logging in.

Japanese Laid-Open Patent Publication No. 2008-273126 discloses a multi-functional peripheral capable of displaying a preferred initial screen for each user when an authentication has been completed successfully with the use of an authentication function provided in the multi-functional peripheral itself. This multi-functional peripheral is configured such that as a preferred initial screen, a screen of the function that is selected first when a plurality of functions are sequentially selected during login or a screen of the function that is frequently selected first is displayed.

However, the multi-functional peripheral described in Japanese Laid-Open Patent Publication No. 2008-273126 does not correspond to the system as described above in which the multi-functional peripheral can operate as a part of the total application system, so that only a screen of the function of the multi-functional peripheral itself serves as the initial screen and the screen displayed when connected to an external application server cannot be used as the initial screen.

That is, in the multi-functional peripheral described in Japanese Laid-Open Patent Publication No. 2008-273126, it is impossible to shift to a screen on which an application of an external application server (external application) can be operated immediately after login. Accordingly, it is necessary after login to select a menu relating to the external application out of menus of the functions unique to the multi-functional peripheral, such as copy, in order to use the external application.

SUMMARY OF THE INVENTION

An object of the present invention is to provide a multi-functional peripheral capable of performing user authentication processing in cooperation with an authentication server and processing in cooperation with an application that is stored in an external application server (processing for realizing the function of an external application) and allowing a user to easily access a screen of the previously used function immediately after logging in without necessity of switching a screen of the function of the multi-functional peripheral itself and a screen of the function of the external application with each login, the authentication server, and a system provided with the multi-functional peripheral, the authentication server and the application server.

The first technical means of the present invention is a multi-functional peripheral connected to an authentication server and an application server, capable of performing user authentication processing via the authentication server and capable of performing processing in cooperation with an application program stored in the application server, comprising: a function information transmission portion for transmitting to the authentication server usage function information indicating a usage function selected by a user operation during time after login information is transmitted to the authentication server and the user authentication processing is performed by the authentication server until immediately after logout; a last information reception portion for receiving from the authentication server last usage function information that has been updated by the authentication server based on the usage function information transmitted in previous login after the user authentication processing is performed; and a display controlling portion for displaying a screen corresponding to the last usage function information received at the last information reception portion as an initial screen after logging in.

The second technical means of the present invention is the multi-functional peripheral as defined in the first technical means, wherein the last information reception portion, when a last usage function indicated by the last usage function information that has been updated by the authentication server indicates a function of the application program, receives an instruction to display a display screen of the last usage function from the authentication server, and the display controlling portion acquires data of the display screen of the last usage function from the application server based on the instruction to display the display screen as an initial screen after logging in, and the last information reception portion, when the last usage function indicated by the last usage function information that has been updated by the authentication server indicates a function executed by the multi-functional peripheral itself, receives an instruction to display a display screen of the last usage function from the authentication server, and the display controlling portion displays the display screen of the last usage function based on the instruction as an initial screen after logging in.

The third technical means of the present invention is the multi-functional peripheral as defined in the first technical means, wherein the function information transmission portion transmits an execution result of a job executed by the user operation to the authentication server as the usage function information.

The fourth technical means of the present invention is the multi-functional peripheral as defined in the first technical means, wherein the function information transmission portion transmits, together with the usage function information, a setting value that is a setting value of a function indicated by the usage function information and that has been set by a user operation during the time after the user authentication processing is performed until immediately after logout to the authentication server, the last information reception portion receives the setting value as a part of the last usage function information, and the multi-functional peripheral further includes a setting value reflection portion for, when the display controlling portion displays the initial screen after logging in, reflecting the setting value received at the last information reception portion.

The fifth technical means of the present invention is the multi-functional peripheral as defined in the first technical means, further comprising: a setting value storage portion for, when the function information transmission portion transmits the usage function information, storing a setting value that is a setting value of a function indicated by the usage function information and that has been set by a user operation during the time after the user authentication processing is performed until immediately after logout; and a setting value reflection portion for, when the display controlling portion displays the initial screen after logging in, reflecting the setting value stored in the setting value storage portion.

The sixth technical means of the present invention is the multi-functional peripheral as defined in the first technical means, wherein the function information transmission portion transmits, together with the usage function information, identification information for identifying the multi-functional peripheral to the authentication server, and the last information reception portion receives from the authentication server last usage function information that is last usage function information that has been updated by the authentication server based on the usage function information transmitted in previous login and that is associated with the identification information of the multi-functional peripheral itself after the user authentication processing is performed.

The seventh technical means of the present invention is the multi-functional peripheral as defined in the first technical means, wherein the function information transmission portion, when a usage function selected by a user operation indicates a function of the application program and it is necessary to use a function executed by the multi-functional peripheral itself with the application program, transmits together with the usage function information necessary function information indicating the function needed to be used with the application program, the last information reception portion, when the authentication server determines that a function indicated by the necessary function information is a function provided in the multi-functional peripheral, receives from the authentication server last usage function information that has been updated in association with the necessary function information by the authentication server based on the usage function information and the necessary function information transmitted from the multi-functional peripheral or other multi-functional peripheral in previous login after the user authentication processing is performed, and when the authentication server determines that the function indicated by the necessary function information is a function not provided in the multi-functional peripheral, receives from the authentication server an instruction to display a default screen of the multi-functional peripheral instead of the last usage function information that has been updated, and the display controlling portion displays a screen corresponding to the last usage function information received at the last information reception portion or the default screen in accordance with an instruction received at the last information reception portion as an initial screen after logging in.

The eighth technical means of the present invention is an authentication server connected to a multi-functional peripheral and performing user authentication processing in the multi-functional peripheral, the multi-functional peripheral being connected to an application server and being capable of performing processing in cooperation with an application program stored in the application server, and the authentication server, comprising: a function information reception portion for receiving from the multi-functional peripheral usage function information indicating a usage function selected by a user operation in the multi-functional peripheral during time after the user authentication processing is executed based on login information received from the multi-functional peripheral until immediately after logout; an updating portion for updating last usage function information corresponding to the login information based on the usage function information received at the function information reception portion; and a last information transmission portion for transmitting to the multi-functional peripheral the last usage function information that has been updated by the updating portion after the user authentication is performed in order to display an initial screen after logging in.

The ninth technical means of the present invention is the authentication server as defined in the eighth technical means, wherein the last information transmission portion transmits to the multi-functional peripheral an instruction to display a display screen of the last usage function as the initial screen after logging in as the last usage function information that has been updated by the updating portion.

The tenth technical means of the present invention is the authentication server as defined in the eighth technical means, wherein the function information reception portion receives an execution result of a job executed by a user operation in the multi-functional peripheral as the usage function information and the updating portion specifies the last usage function information from the execution result of the job for updating.

The eleventh technical means of the present invention is the authentication server as defined in the eighth technical means, wherein the last information transmission portion, when a last usage function indicated by the last usage function information that has been updated by the updating portion is a usage function that is set to be unavailable in the multi-functional peripheral for a user indicated by the login information in transmission of the last usage function information, transmits last usage function information indicating other last usage function.

The twelfth technical means of the present invention is the authentication server as defined in the eighth technical means, wherein the function information reception portion receives from the multi-functional peripheral, together with the usage function information, a setting value that is a setting value of a function indicated by the usage function information and that has been set by a user operation during the time after the user authentication processing is performed until immediately after logout, the updating portion updates last usage function information including the setting value corresponding to the login information based on the usage function information and the setting value received at the function information reception portion, and the last information transmission portion transmits to the multi-functional peripheral the last usage function information including the setting value.

The thirteen technical means of the present invention is the authentication server as defined in the eighth technical means, wherein the function information reception portion receives, together with the usage function information, identification information for identifying the multi-functional peripheral, the updating portion updates last usage function information corresponding to the login information and the identification information based on the usage function information and the identification information received at the function information reception portion, and the last information transmission portion transmits to the multi-functional peripheral the last usage function information corresponding to the identification information of the multi-functional peripheral subjected to the user authentication processing after the user authentication processing is performed.

The fourteen technical means of the present invention is the authentication server as defined in the eighth technical means, wherein the function information reception portion, when a usage function selected by a user operation in the multi-functional peripheral indicates a function of the application program and it is necessary to use a function executed by the multi-functional peripheral itself with the application program, receives from the multi-functional peripheral, together with the usage function information, necessary function information indicating the function needed to be used with the application program, the updating portion updates last usage function information corresponding to the login information based on the usage function information received at the function information reception portion and associates the necessary function information received at the function information reception portion with the last usage function information, and the last information transmission portion, after the user authentication processing is performed and it is determined that a function indicated by the necessary function information associated with the last usage function information is a function provided in the multi-functional peripheral, transmits to the multi-functional peripheral the last usage function information that has been updated by the updating portion, and when it is determined that the function indicated by the necessary function information is a function not provided in the multi-functional peripheral, transmits to the multi-functional peripheral an instruction to display a default screen of the multi-functional peripheral instead of the last usage function information that has been updated by the updating portion.

The fifteen technical means of the present invention is a system comprising the multi-functional peripheral as defined in the first technical means, the authentication server as defined in the eighth technical means and an application server connected to the multi-functional peripheral and the authentication server and having the application program stored therein.

The sixteen technical means of the present invention is a system including an authentication server, an application server having an application program stored therein and a multi-functional peripheral provided with a display portion capable of performing user authentication processing via the authentication server and capable of performing processing in cooperation with the application program, wherein during time after login information is transmitted from the multi-functional peripheral to the authentication server and the user authentication processing is performed by the authentication server until immediately after logout, usage function information indicating a usage function selected by a user operation is saved as last usage function information and the display portion is caused to display a screen corresponding to the last usage function information as an initial screen after logging in next time.

BRIEF DESCRIPTION OF THE DRAWINGS

FIG. 6 is a diagram illustrating an example of a table for managing valid/invalid of functions of the multi-functional peripheral managed by the user information management DB of the authentication server in the system of FIG. 1;

FIG. 16 is a diagram illustrating another example of the last usage function management table managed by the user information management DB of the authentication server in the system of FIG. 1;

PREFERRED EMBODIMENTS OF THE INVENTION

Figure 1:
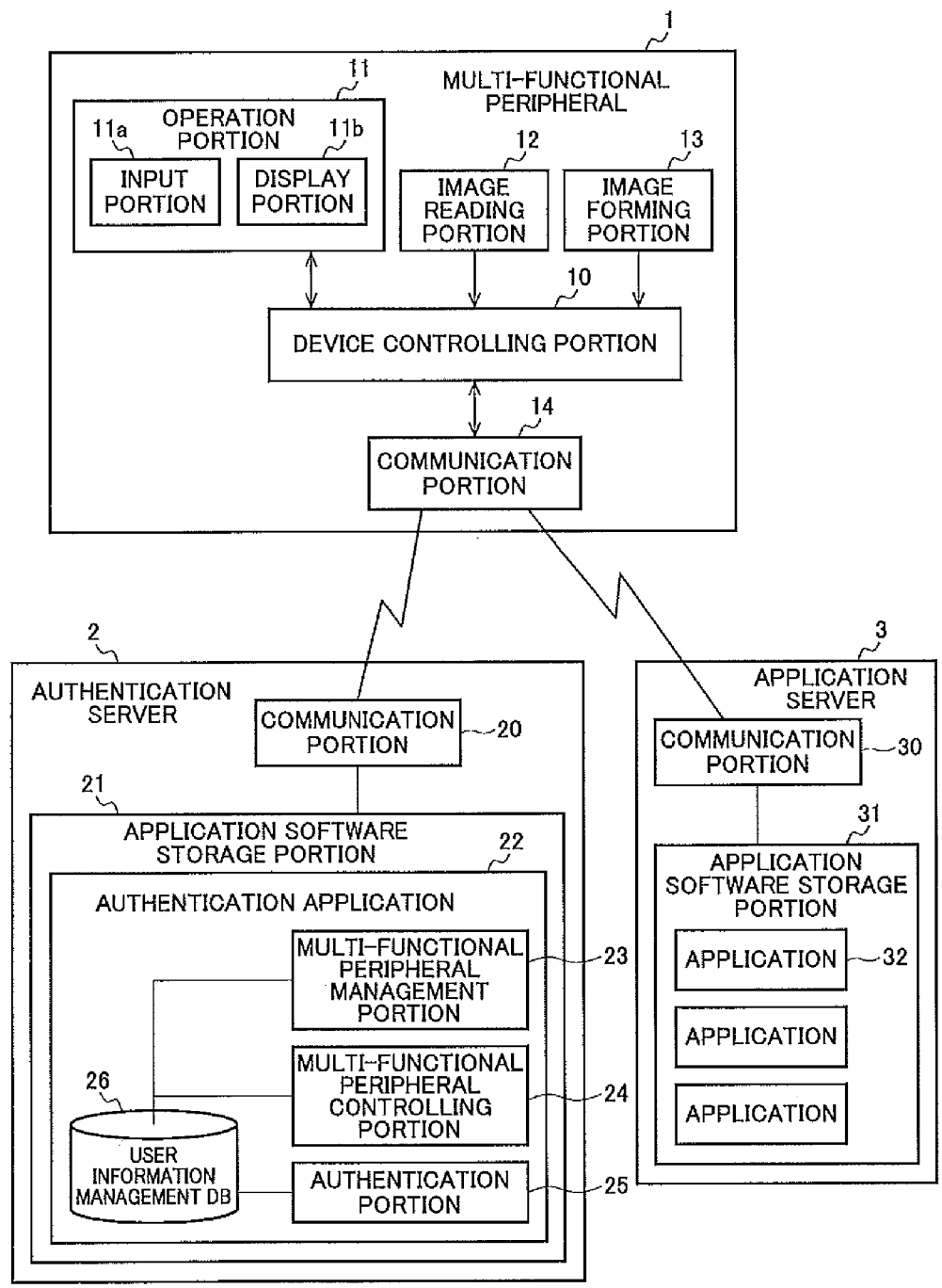
FIG. 1 is a block diagram illustrating a schematic configuration example of a system including a multi-functional peripheral according to an embodiment of the present invention.

FIG. 1 is a block diagram illustrating a schematic configuration example of a system including a multi-functional peripheral according to an embodiment of the present invention. The system shown in FIG. 1 is provided with a multi-functional peripheral 1, an authentication server 2 and an application server (external application server) 3.

The application server 3 may be configured as an apparatus which is physically the same as the authentication server 2. Moreover, both the application server 3 and the authentication server 2 may be configured to incorporate a server program on a PC. Note that, what is simply called an "application" herein indicates an application program (application software).

The multi-functional peripheral 1 is a digital multi-functional peripheral or an analogue multi-functional peripheral, and is provided with a device controlling portion 10, an operation portion 11, an image reading portion 12, an image forming portion 13 and a communication portion 14. The device controlling portion 10 controls each portion provided in the multi-functional peripheral 1. The operation portion 11 has an input portion 11a and a display portion 11b such as an LCD (Liquid Crystal Display). The input portion 11a has various input key groups and a touch panel for accepting user input provided in the display portion 11b.

The image reading portion 12 reads an original placed on a document platen or an automatic document feeder and inputs image data. The image forming portion 13 performs printing processing for image data input from the image reading portion 12 or image data input from an external PC via the communication portion 14. This system allows printing to be executed and therefore can be said as a "printing system". The communication portion 14 communicates with an information processing apparatus via a network such as a wired LAN (Local Area Network) or a wireless LAN. As the information processing apparatus to be communicated, an authentication server 2 and an application server 3 are incorporated in the system.

The authentication server 2 is a server computer provided with a communication portion 20 and an application software storage portion 21. The communication portion 20 communicates with the multi-functional peripheral 1 via the network such as a wired LAN or a wireless LAN. The application software storage portion 21 stores an authentication application 22 for controlling the multi-functional peripheral 1.

The authentication application 22 is provided with a multi-functional peripheral management portion 23, a multi-functional peripheral controlling portion 24 and an authentication portion 25 as applications and is provided with a user information management database (DB) 26 as data. The multi-functional peripheral management portion 23 associates user information with the multi-functional peripheral 1. The multi-functional peripheral controlling portion 24 manages valid/invalid of each elemental function of the multi-functional peripheral 1. Each of the elemental functions will be described below. The authentication portion 25 carries out user authentication. The user information management DB 26 is a database in which user information is managed.

The device controlling portion 10 of the multi-functional peripheral 1 transmits, via the communication portion 14 and the communication portion 20 between the authentication application 22 stored in the authentication server 2, information of a user operation input by the input portion 11a (hereinafter referred to also as operation panel information) to the authentication server 2 side as well as exchanges information for controlling a device of a communication party and device control information serving as information responding thereto, while calling the function of the authentication application 22 to acquire the result of authentication processing thereof. This allows the multi-functional peripheral 1 to perform processing in cooperation with the authentication application 22 (processing for realizing the function of the authentication application, that is, authentication processing).

The application server 3 is a server computer provided with a communication portion 30 and an application software storage portion 31. The communication portion 30 communicates with the multi-functional peripheral 1 via the network such as a wired LAN or a wireless LAN. The application software storage portion 31 stores an application 32 for controlling the multi-functional peripheral 1.

The device controlling portion 10 of the multi-functional peripheral 1 transmits, via the communication portion 14 and the communication portion 30 between the application 32 stored in the application server 3, the operation panel information to the application server 3 side as well as exchanges the device control information, while calling the function of the application 32 (hereinafter referred to as the external application function) to acquire the result of processing thereof. This allows the multi-functional peripheral 1 to perform processing in cooperation with the application 32 (processing for realizing the external application function). One external application function corresponds to one application stored in the application server 3 and is able to be provided in the multi-functional peripheral 1 for each application stored.

The operation panel information and the device control information described above are transmitted including device information of a device on the transmitting side so that a transmission source can be recognized on the receiving side. The device information is information unique to the device and indicates identification information for enabling identification from other devices. Illustrating the multi-functional peripheral 1, the device information is identification information for enabling identification of the multi-functional peripheral 1 from other devices (other multi-functional peripherals and the authentication server 2 etc.) and examples thereof include a device number (serial number) unique to the multi-functional peripheral 1 and a MAC (Media Access Control) address.

Here, it is preferable that the exchanging of information between the multi-functional peripheral 1 and the application 32 is performed based on a standard network technology in terms of that a lot of general tools and skills can be used for development of a part of cooperation between the application 32 and the device controlling portion 10 (firmware in the device controlling portion 10) of the multi-functional peripheral 1 and mounting thereof is easy. Note that, same thing can be said of the exchanging of information between the authentication application 22 and the multi-functional peripheral 1 described above.

Next, description will be given for a case where processing for displaying an initial screen (initial screen after logging), which is the main characteristic of the present invention, is applied to the system having the configuration described above.

Figure 2:
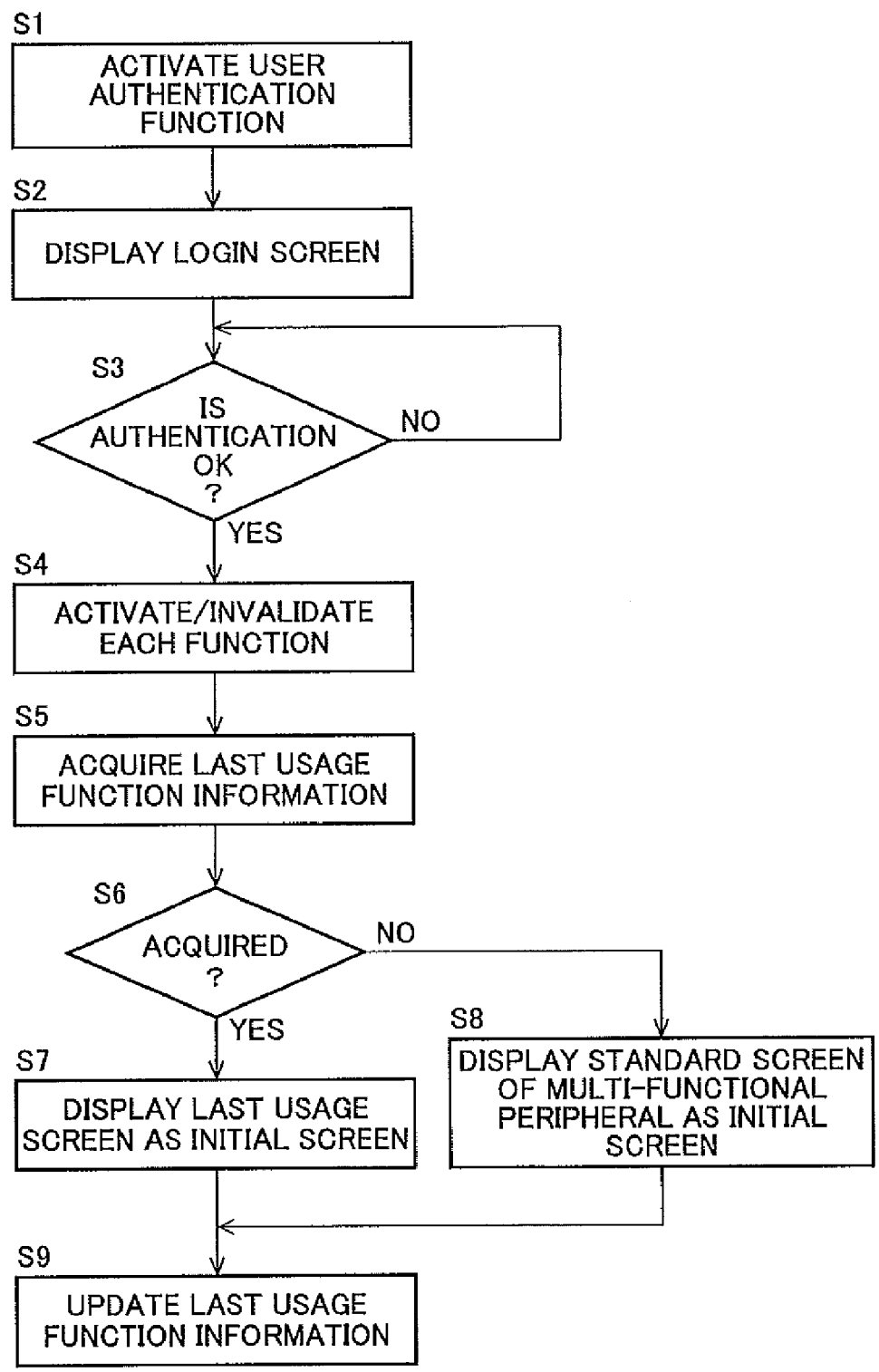
FIG. 2 is a flowchart for describing an example of initial screen display processing in the system of FIG. 1.
Figure 3:
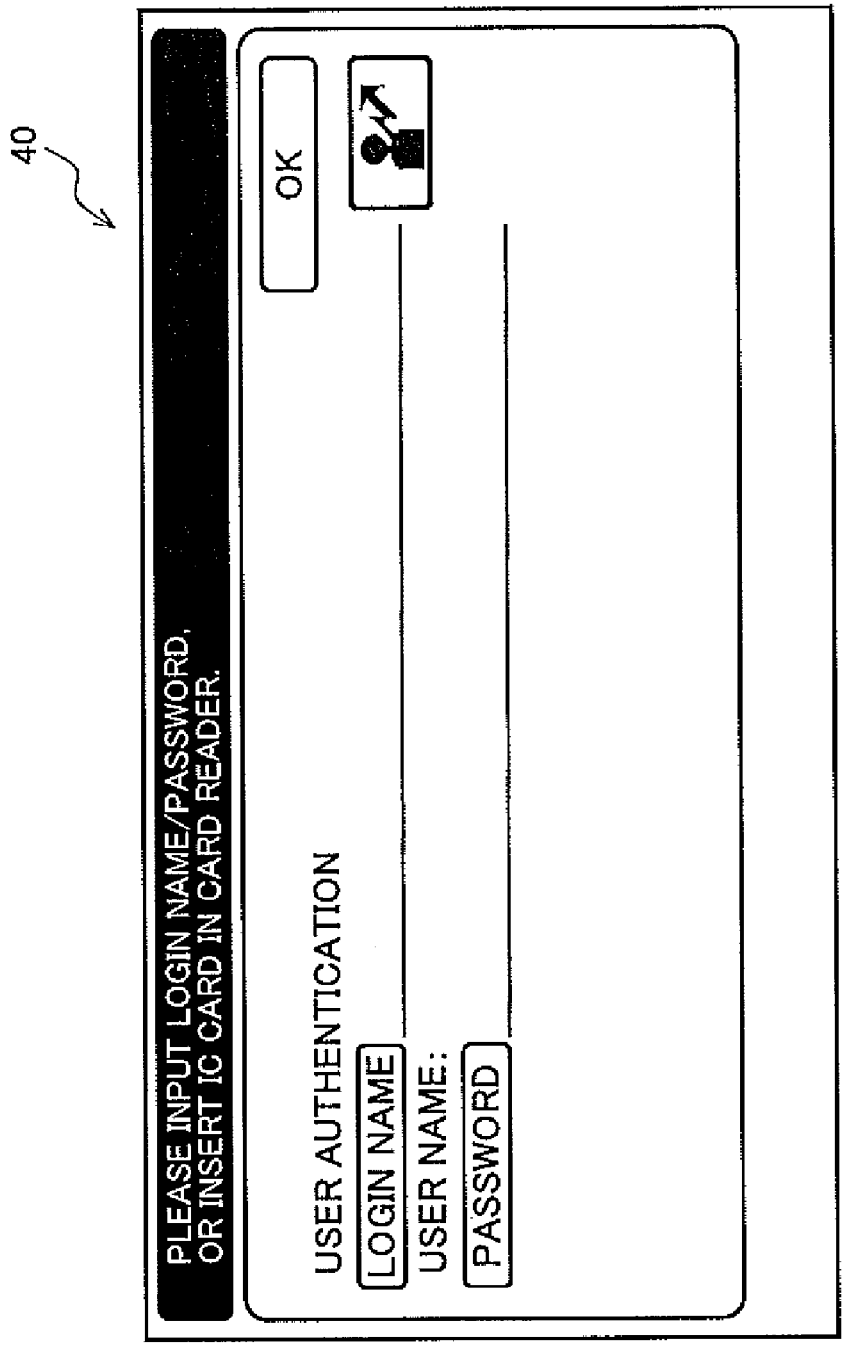
FIG. 3 is a diagram illustrating an example of a login screen displayed in the multi-functional peripheral in the initial screen display processing of FIG. 2.
Figure 4:
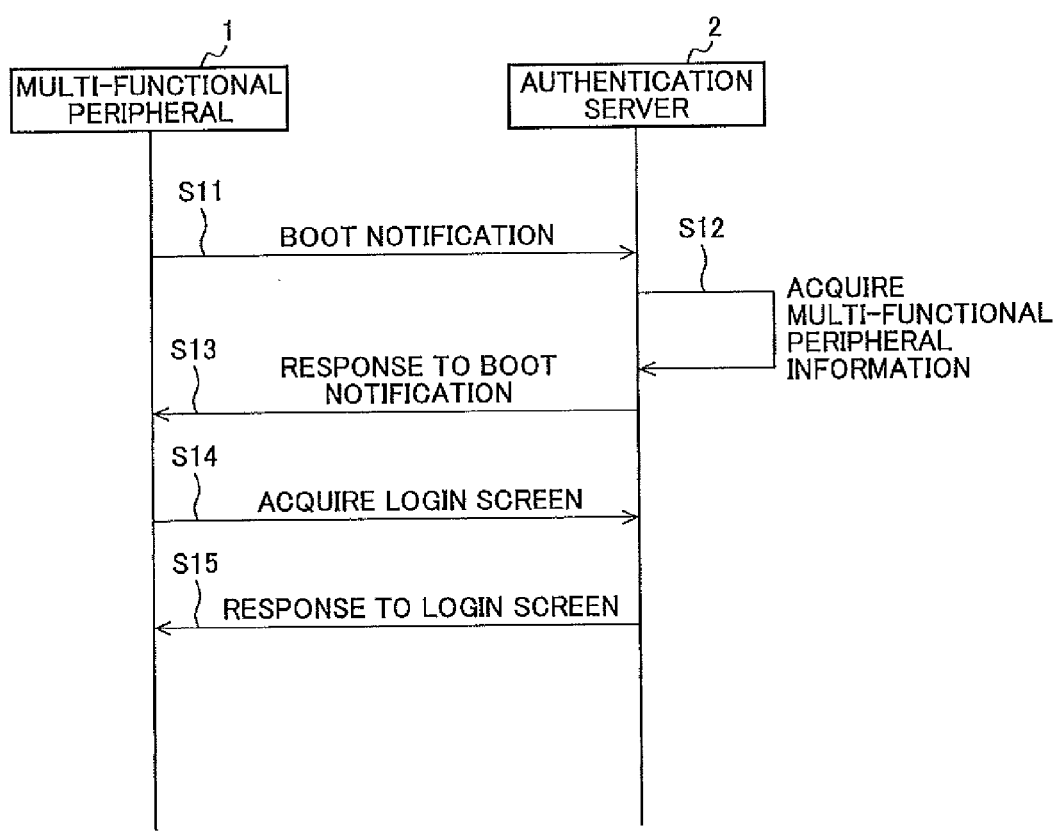
FIG. 4 is a diagram illustrating a sequence of login screen display processing performed after the multi-functional peripheral is turned on in the initial screen display processing of FIG. 2.

FIG. 2 is a flowchart for describing an example of initial screen display processing in the system of FIG. 1. Further, FIG. 3 is a diagram illustrating an example of a login screen displayed in the multi-functional peripheral in the initial screen display processing of FIG. 2 and FIG. 4 is a diagram illustrating a sequence of login screen display processing performed after the multi-functional peripheral is turned on in the initial screen display processing of FIG. 2.

User authentication processing performed by the multi-functional peripheral 1 and the authentication server 2 in cooperation starts from activating the authentication function first (step S1). At step S1, when an administrator of the multi-functional peripheral performs an operation of activating the user authentication function from the operation portion 11, information thereof is transmitted to the device controlling portion 10 and the user authentication function is set to be valid.

When the user authentication function is activated, the device controlling portion 10 of the multi-functional peripheral 1 causes the display portion 11b to display an authentication screen (login screen) acquired from the authentication server 2 (step S2). Thereby, for example, a login screen 40 of FIG. 3 is displayed. The login screen 40 allows inputting of a login name and a password. In addition, when the user authentication is performed by an IC (Integrated Circuit) card etc., the login screen 40 also displays a sentence for urging to insert the IC card into a card reader.

The processing for displaying the login screen 40 at step S2 will be described in detail with reference to FIG. 4. Although the login screen 40 is acquired from the authentication server 2 as described above, it is necessary in the acquirement that the authentication server 2 regards the multi-functional peripheral 1 as an authentication target.

Therefore, when the user authentication function is activated at step S1, the device controlling portion 10 of the multi-functional peripheral 1 transmits a boot notification including the device information of the multi-functional peripheral 1 and information indicating that the user authentication function has been activated to the authentication server 2 (step S11). Note that, including the transmission processing in this case, the transmission processing from the multi-functional peripheral 1 to the authentication server 2 is performed such that the device controlling portion 10 gives an instruction to the communication portion 14 and the communication portion 14 transmits to the authentication server 2, which is received by the communication portion 20 of the authentication server 2. Moreover, the information transmitted at step S11 and steps S13 to S15 described below corresponds to the device control information described above.

The same processing as the processing at step S11 is also performed when the user authentication function is changed from valid to invalid and a boot notification including the device information of the multi-functional peripheral 1 and information indicating that the user authentication function has been invalidated is transmitted to the authentication server 2. In addition, when the multi-functional peripheral 1 is turned on, the processing at step S11 is also performed under the condition that the user authentication function has been already activated, and the boot notification including the device information of the multi-functional peripheral 1 is transmitted to the authentication server 2.

When the authentication application 22 which operates on the authentication server 2 receives the boot notification at step S11 from the communication portion 20, the multi-functional peripheral management portion 23 acquires multi-functional peripheral information from an internal memory (internal memory of the authentication server 2) using the device information as a key (step S12). Here, the multi-functional peripheral information includes device information of the multi-functional peripheral, information indicating whether the multi-functional peripheral indicated by the device information is powered on or off and information indicating whether or not the multi-functional peripheral indicated by the device information is targeted for the authentication (targeted for performing the user authentication processing).

Further, when detecting, from the acquired multi-functional peripheral information, that the multi-functional peripheral 1 is powered on from off among multi-functional peripherals managed by the multi-functional peripheral information, the multi-functional peripheral management portion 23 rewrites the multi-functional peripheral information so as to regard the multi-functional peripheral 1 as the authentication target under the condition that the user authentication function has been already activated. On the other hand, when detecting, from the acquired multi-functional peripheral information, that the user authentication function of the multi-functional peripheral 1 is changed from invalid to valid, the multi-functional peripheral management portion 23 (I) rewrites the multi-functional peripheral information regarding the multi-functional peripheral 1 as the authentication target (rewrites from invalid to valid) or (II) creates multi-functional peripheral information from the device information by newly adding as the authentication target. Such processing allows the multi-functional peripheral management portion 23 to add the multi-functional peripheral 1 as the authentication target.

Note that, when detecting that another multi-functional peripheral is powered on, the multi-functional peripheral management portion 23 may rewrite the multi-functional peripheral information so as to exclude the multi-functional peripheral which has been the authentication target as being powered on (the multi-functional peripheral 1 in this example) from the authentication target, but it is preferable that a plurality of multi-functional peripherals remain the authentication target simultaneously so that a plurality of multi-functional peripherals correspond. Further, when the boot notification including information indicating that the user authentication function has been invalidated is received, the multi-functional peripheral information may be rewritten (rewritten from valid to invalid) so as to exclude the multi-functional peripheral 1 from the authentication target or the multi-functional peripheral information itself of the multi-functional peripheral 1 may be deleted.

Subsequent to step S12, the authentication application returns a response (information indicating that, for example, the user authentication function is turned on and the boot can be confirmed) to the boot notification via the communication portion 20 (step S13). Including the transmission processing in this case, the transmission processing from the authentication server 2 to the multi-functional peripheral 1 is performed such that the authentication application 23 gives an instruction to the communication portion 20 and the communication portion 20 transmits to the multi-functional peripheral 1, which is received by the communication portion 14 of the multi-functional peripheral 1.

The device controlling portion 10 of the multi-functional peripheral 1 that has received the response at step S13 requests acquirement of a login screen via the communication portion 14 (step S14). Upon the request, the authentication application 22 reads out the login screen 40 from the internal memory of the authentication server 2 via the communication portion 20 to return to the multi-functional peripheral 1 (step S15). Then, the device controlling portion 10 of the multi-functional peripheral 1 causes the display portion 11b to display the received login screen 40 as an operation screen. Thereby, the processing at step S2 of FIG. 2 is completed.

After the processing at step S2, a user inputs login information consisting of a user name and a password (or information in an IC card) by the input portion 11a (or an IC card reader), and the device controlling portion 10 that has received it requests user authentication processing to the authentication server 2 and the authentication application 22 of the authentication server 2 that has received the request determines whether the authentication has been completed successfully (step S3).

Figure 5:
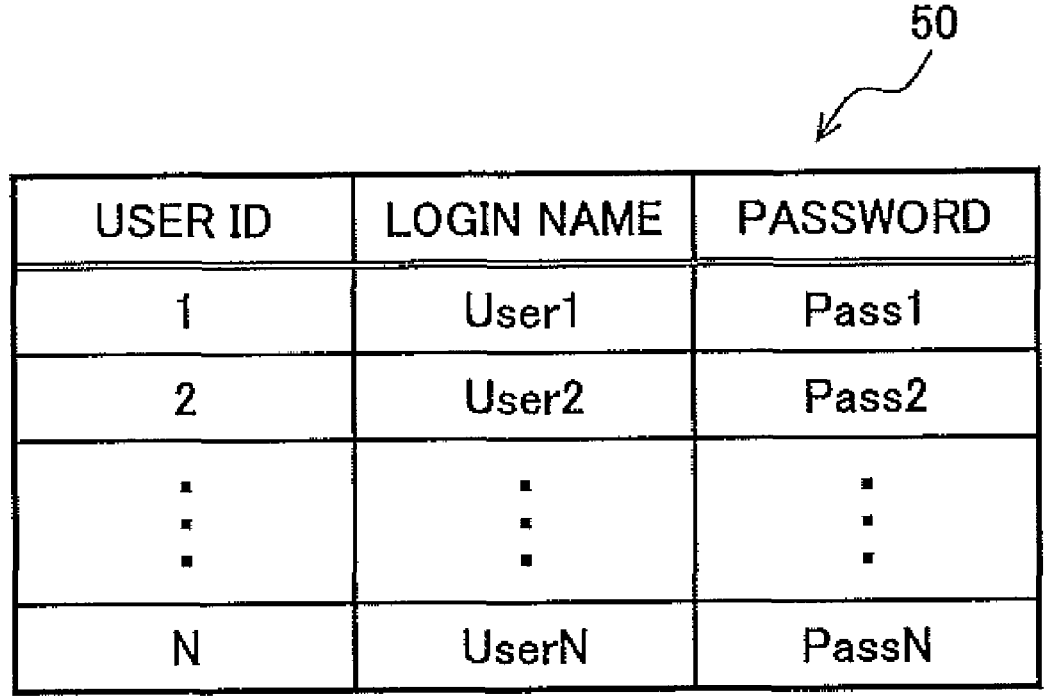
FIG. 5 is a diagram illustrating an example of a user management table managed by a user information management DB of an authentication server in the system of FIG. 1.

The user authentication processing at step S3 will be described in detail with reference to FIG. 5. FIG. 5 is a diagram illustrating an example of a user management table managed by the user information management DB of the authentication server in the system of FIG. 1. A user management table 50 of FIG. 5 is included in the user information management DB 26, in which a login name and a password are stored in association with each other for each user ID as each user authentication information.

The login information input by the user is transmitted from the multi-functional peripheral 1 to the authentication server 2. The login information is transmitted as the operation panel information described above. Then, the authentication portion 25 matches the received login information and the user management table 50 to carry out the authentication based on whether or not there is user authentication information in conformity with the received login information in the user management table 50.

When the authentication has failed (in the case of NO at step S3), a response is given to the multi-functional peripheral 1 side as an authentication error, and the device controlling portion 10 of the multi-functional peripheral 1 causes the display portion 11b to display the login screen transmitted simultaneously depending on the response (or the login screen held in the multi-functional peripheral 1 until the authentication has been completed successfully) to urge re-entry to the user. Only when the authentication has been completed successfully, the flow goes to step S4 described below. In this manner, the multi-functional peripheral 1 is able to carry out the user authentication in cooperation with the authentication server 2.

When the authentication has been completed successfully (in the case of YES at step S3), the multi-functional peripheral controlling portion 24 closes the login screen and transmits a control command for activating or invalidating each function of the multifunctional peripheral to the multi-functional peripheral 1. The multi-functional peripheral 1 that has received the control command closes the login screen and activates or invalidate the function of the multi-functional peripheral 1 (step S4).

The activating/invalidating processing in the processing at step S4 will be described in detail with reference to FIG. 6. FIG. 6 is a diagram illustrating an example of a function valid/invalid management table managed by the user information management DB of the authentication server in the system of FIG. 1.

A function valid/invalid management table 51 of FIG. 6 is included in the user information management DB 26, in which information indicating valid/invalid of each function (elemental function) of the multi-functional peripheral is stored in association with each other for each user ID. Note that, the information indicating valid/invalid (referred to as valid/invalid information) is information indicating user restriction to the function and can be said as authority information.

The multi-functional peripheral controlling portion 24 manages the valid/invalid information for each elemental function described in the function valid/invalid management table 51 by rewriting depending on a changing request from the multi-functional peripheral 1 side. Note that, only when the login information of the administrator user is transmitted from the multi-functional peripheral 1, the changing request may be enabled, that is, update may be enabled. Further, the multi-functional peripheral controlling portion 24 controls to restrict each elemental function on the multi-functional peripheral 1 side based on the managed valid/invalid information.

In the function valid/invalid management table 51, elemental functions are managed by classifying into large categories (categories of operation modes here) such as a copy function, a scan function, a fax function, a print function and a document management application function, but, for example, scan may be classified into specific categories such as a function of scan to e-mail transmission and a function of scan to FTP (File Transfer Protocol) transmission. Further, the valid/invalid information may be managed for each specific setting such as managing of the valid/invalid information by classifying into a category such as color information (monochrome/full-color).

The document management application function indicates the function in cooperation with the document management application stored in the application server 3 as one of the applications 32. In this manner, the external application function is also targeted for management here. As in this example, not only for each function of the multi-functional peripheral itself, it is preferable that the valid/invalid information of the external application function is managed. The valid/invalid information may be managed for each application 32 stored in the application server 3 so as to be executable when being in cooperation with the multi-functional peripheral 1, that is, for each external application function. Further, the valid/invalid information may be managed, for example, for each application 32 or for each setting in the application 32 by classifying into more specific categories. In addition, regarding the functions that can be also used in combination with the external application function, such as a print function, the valid/invalid information may be managed for each combination thereof. For example, management may be performed with the valid/invalid information of the function for printing using the function of the multi-functional peripheral itself and the valid/invalid information of the function for printing using the external application function. Of course, the valid/invalid information may be managed only for each function of the multi-functional peripheral itself.

When the authentication has been completed successfully (in the case of YES at step S3), the multi-functional peripheral controlling portion 24 firstly refers to the function valid/invalid management table 51 based on the login information and determines whether each function of the multi-functional peripheral 1 is valid or invalid for the user indicated by the login information by reading out the valid/invalid information. More specifically, using the user ID logged in as a key, the valid/invalid information corresponding to the matching user ID is extracted from the function valid/invalid management table 51 and valid/invalid is determined for each function determined for the user based on the extracted valid/invalid information.

Then, the multi-functional peripheral controlling portion 24 generates a control command to, for the user, activate the function of the multi-functional peripheral 1 that is valid and invalidate the function of the multi-functional peripheral 1 that is invalid to transmit to the multi-functional peripheral 1. The device controlling portion 10 of the multi-functional peripheral 1 that has received the control command activates or invalidates each function of the multi-functional peripheral 1.

In this manner, the authentication server 2 is able to control for each user permission for using the functions of the multi-functional peripheral itself (for example, a copy function, a scan function, a fax function and a print function etc.) and permission for using the external application function with respect to the multi-functional peripheral 1.

Regarding the processing for closing the login screen in the processing at step S4, a command for closing may be included in the control command above so that the multi-functional peripheral 1 that has received the control command closes the login screen accordingly.

In the present invention, a control is performed to cause the display portion 11b to display the following initial screen (initial screen after logging in) instead of the login screen that is closed in this manner. An example of the control will be described with reference to FIGS. 7 to 12.

In order to display the initial screen after logging in, the multi-functional peripheral controlling portion 24 of the authentication server 2 firstly acquires last usage function information described below from the user information management DB 26 (step S5).

Figure 7:
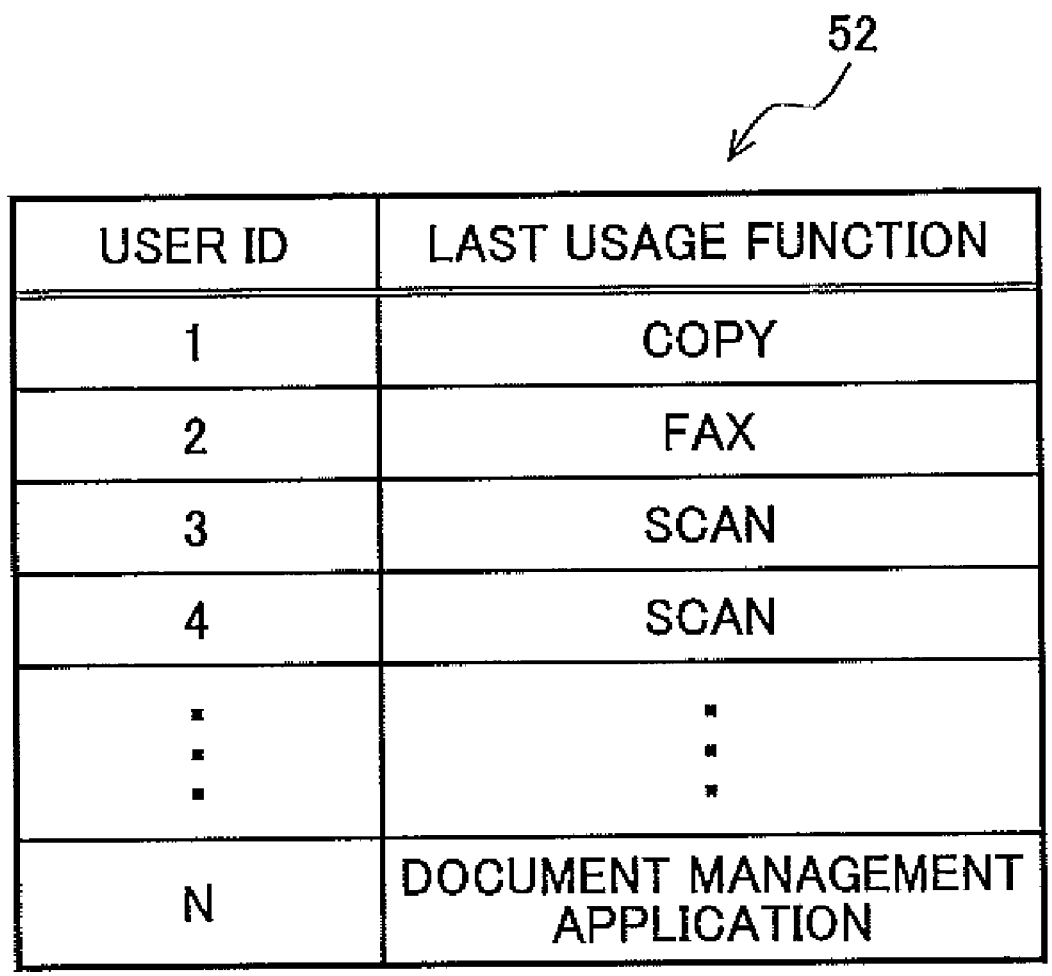
FIG. 7 is a diagram illustrating an example of a last usage function management table managed by the user information management DB of the authentication server in the system of FIG. 1.

The last usage function information will be described with reference to FIG. 7. FIG. 7 is a diagram illustrating an example of a last usage function management table managed by the user information management DB of the authentication server in the system of FIG. 1. The last usage function information is stored in association with each other for each user ID in the last usage function management table 52 of FIG. 7. The last usage function information is information indicating the elemental function that is lastly used (that is used most recently) by the user in previous login and is acquired by appropriately updating the elemental functions used by the user, that is, usage functions. An example of the update will be described below with reference to FIG. 12.

At step S5, using the login information of the user who has been authenticated successfully at step S3 (that is associated using the user ID in this example) as a key, the multi-functional peripheral controlling portion 24 acquires last usage function information of the user from the last usage function management table 52 of the user information management DB 26.

The multi-functional peripheral controlling portion 24 determines whether or not the last usage function information of the user is acquired (step S6). When acquired (in the case of YES at step S6), the multi-functional peripheral controlling portion 24 instructs the multi-functional peripheral 1 to display a screen of the function indicated by the last usage function information (referred to as the last usage screen) and the device controlling portion 10 causes the display portion 11b to display the last usage screen as the initial screen after login in accordance with the instruction (step S7). The initial screen of the function may be employed as the screen of the function indicated by the last usage function information.

In this manner, the authentication server 2 is provided with a last information transmission portion for transmitting, after the user authentication processing is performed, to the multi-functional peripheral 1 the last usage function information (which can be also said as initial screen mode setting information) that has been updated by an updating portion described below as the instruction described above in order to display the initial screen after logging in. The last information transmission portion is able to be illustrated with the multi-functional peripheral controlling portion 24 and the communication portion 20. On the other hand, the multi-functional peripheral 1 is provided with a last information reception portion for receiving, after the user authentication processing is performed, from the authentication server 2 the last usage function information (initial screen mode setting information) that has been updated by the authentication server 2 based on the usage function information transmitted in previous login and a display controlling portion for displaying a screen corresponding to the received last usage function information as the initial screen after logging in. The last information reception portion is able to be illustrated with the communication portion 14 and the device controlling portion 10 and the display controlling portion is able to be illustrated with the device controlling portion 10 for controlling a display of the display portion 11b.

The processing at step S7 will be specifically described. First, the multi-functional peripheral controlling portion 24 selects an initial screen of the function indicated by the last usage function information (last usage screen) (or with the function indicated by the last usage function information selected) and transmits a control command for activating a display of the selected last usage screen (or a control command for activating a display of the selected initial screen of the function) to the multi-functional peripheral 1. The control command corresponds to a control command for giving an instruction to switch a screen, that is, an instruction to change a screen. The device controlling portion 10 of the multi-functional peripheral 1 that has received the control command reads out from the internal memory or receives from the application server 3 the selected last usage screen (or the selected screen of the function, that is, the last usage screen) to display as the initial screen after logging in by the display portion 11b.

In this manner, the last information transmission portion of the authentication server 2 transmits an instruction to display the display screen of the last usage function as the initial screen after logging in to the multi-functional peripheral 1. The last information reception portion of the multi-functional peripheral 1 then receives the instruction to display the display screen of the last usage function from the authentication server 2 and the display controlling portion causes the display portion 11b to display the display screen of the last usage function as the initial screen after logging in based on the instruction.

The acquirement of the last usage screen displayed as the initial screen in the multi-functional peripheral 1 will be described. When the function indicated by the last usage function information is the function of the multi-functional peripheral itself (for example, copy function etc., which is the function executed by the multi-functional peripheral itself), the last usage screen may be readout from the internal memory in accordance with the control command described above to be displayed by the display portion 11b.

On the other hand, when the function indicated by the last usage function is the external application function (for example, the document management application function), the screen to be displayed in accordance with the control command described above is determined as a screen (setting screen) of the external application and the application server 3 is notified (requested) to transmit data defining the screen indicated by the last usage function (last usage screen), for example, HTML (Hypertext Markup Language) data to the multi-functional peripheral 1. Upon the notification, the application server 3 transmits the data to the multi-functional peripheral 1 and the device controlling portion 10 of the multi-functional peripheral 1 causes the display portion 11b to display the received data. In this manner, when the last usage function indicated by the last usage function information that has been updated by the authentication server 2 shows the function of the application, the display controlling portion acquires from the application server 3 data of a display screen of the last usage function based on the instruction from the authentication server 2 to display the display screen as the initial screen after logging in.

By the reception of the notification as described above, the initial screen as illustrated in FIGS. 8 to 11 is displayed on the display portion 11b. FIGS. 8, 9, 10 and 11 are diagrams illustrating an example of a copy screen, a scan screen, a fax screen and a document management application screen, respectively, displayed as an initial screen after login in the multi-functional peripheral by the initial screen display processing of FIG. 2.

Figure 8:
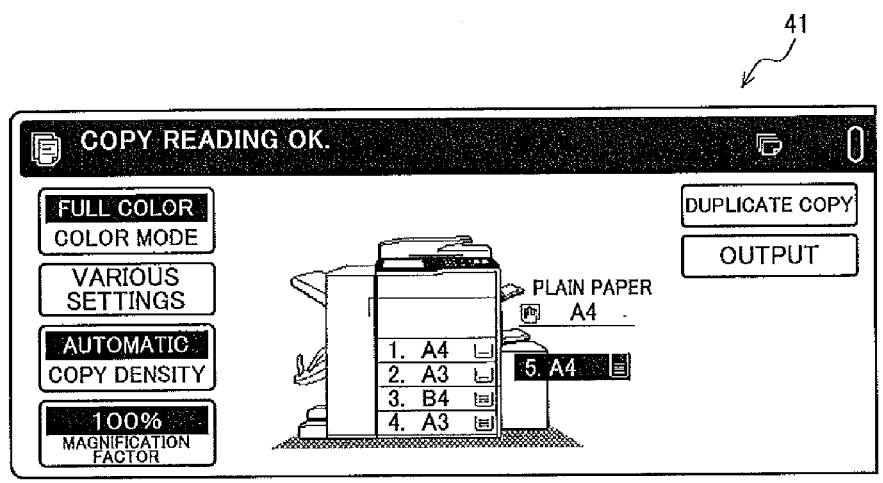
FIG. 8 is a diagram illustrating an example of a copy screen displayed in the multi-functional peripheral as an initial screen after logging in by the initial screen display processing of FIG. 2.
Figure 9:
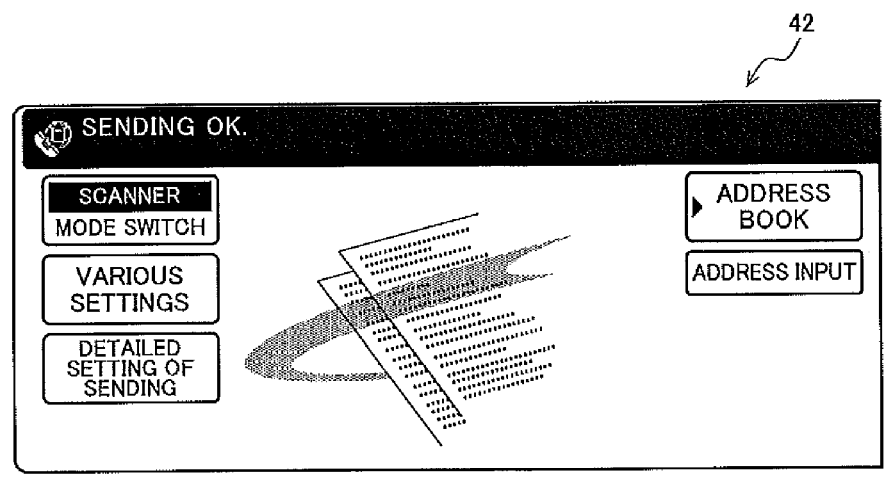
FIG. 9 is a diagram illustrating an example of a scan screen displayed in the multi-functional peripheral as an initial screen after logging in by the initial screen display processing of FIG. 2.
Figure 10:
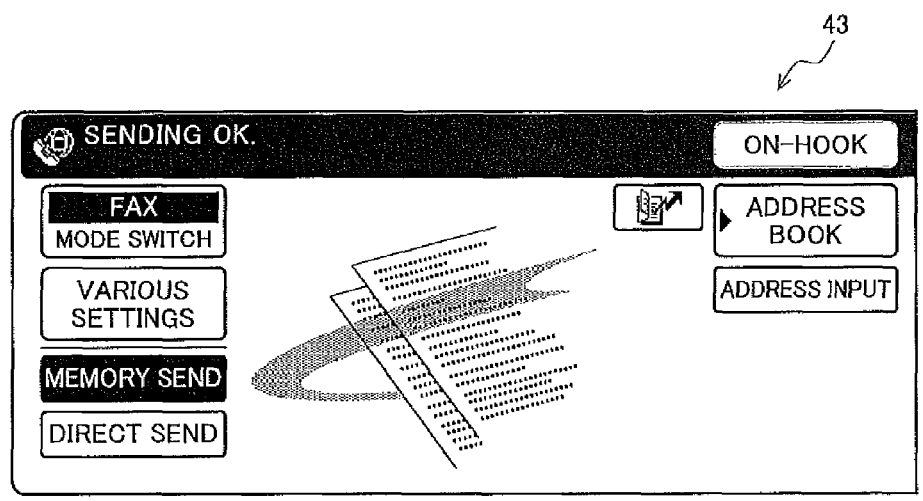
FIG. 10 is a diagram illustrating an example of a fax screen displayed in the multi-functional peripheral as an initial screen after logging in by the initial screen display processing of FIG. 2.
Figure 11:
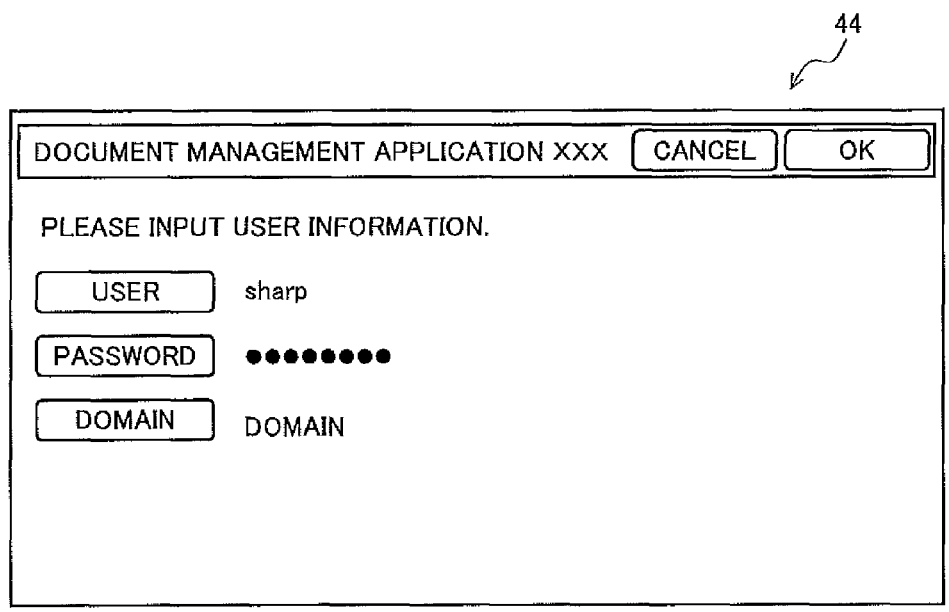
FIG. 11 is a diagram illustrating an example of a document management application screen displayed in the multi-functional peripheral as an initial screen after logging in by the initial screen display processing of FIG. 2.

A copy screen 41 of FIG. 8, a scan screen 42 of FIG. 9 and a fax screen 43 of FIG. 10 are all initial screens of the function of the multi-functional peripheral itself, each of which is displayed when a user ID is "1" and "3" or "4" and "2" in the example of the last usage function management table 52. A document management application screen 44 of FIG. 11 is an example of a display screen of the external application function and is displayed when a user ID is "N" in the example of the last usage function management table 52. Note that, the document management application screen 44 is illustrated with a screen of an application "document management application XXX" out of applications 32 stored in the application server 3.

Without limitation to these examples, when information of the elemental function in a more specific category (for example, the address book selection function in the fax function) is stored in the last usage function management table 52 as the last usage function information, the screen of the elemental function in the specific category (the address book selection screen in the fax function in the example described above) is selected by the multi-functional peripheral controlling portion 24 and is eventually displayed by the display portion 11b.

Note that, the document management application screen 44 is illustrated with a login screen for accessing the document management application XXX. As illustrated here, the user authentication for the application server 3 to use the application 32 does not necessarily need to be carried out on the authentication server 2 side by managing by the function valid/invalid management table 51 of FIG. 6 and can be carried out if the document management application function (the function of the document management application XXX) can be described as the usage function in the last usage function management table 52. When managed by the function valid/invalid management table 51, a screen that enables to use the document management application XXX directly may be displayed instead of the login screen as the document management application screen 44, in which a user authentication may be requested again as in this example.

On the other hand, when the last usage function of the user is not able to be acquired (in the case of NO at step S6), the multi-functional peripheral controlling portion 24 selects to display a standard screen (standard initial screen) of the multi-functional peripheral 1 and transmits a control command for activating a display of the standard screen (a control command for giving an instruction to switch a screen, that is, an instruction to change a screen) to the multi-functional peripheral 1 (step S8). At step S8, the device controlling portion 10 of the multi-functional peripheral 1 that has received the control command further reads out the standard screen of the multi-functional peripheral 1 from the internal memory and causes the display portion 11b to display as the initial screen after logging in. Note that, in the case of the first login where the user has never logged in, NO is said at step S6 so that the processing at step S8 is applied and the standard screen is displayed.

Further, an example has been taken that the standard screen of the multi-functional peripheral 1 is displayed at step S8, but without limitation thereto, a screen that has been set in advance to the authentication server 2 by the administrator user may be displayed. For example, a screen explaining the initial screen display processing of the present invention or the like may be displayed. In this case, the standard screen of the multi-functional peripheral 1 may be displayed with an access or without an access to the authentication server 2 only after a confirmation key (or an OK key) is selected on the explanation screen.

In addition, the multi-functional peripheral controlling portion 24 gives an instruction to change the screen to the multi-functional peripheral 1 at step S7 or step S8, but this instruction may be given substantially at the same time with the instruction to close the login screen described above. Of course, it may be configured such that the control command transmitted at step S4 may not include the command for closing the login screen, and then transmitted as the control command for changing the login screen to the initial screen to the multi-functional peripheral 1 at step S7 or step S8.

When the processing at step S7 or the processing at step S8 is completed, the user displays a screen of the desired function while operating the multi-functional peripheral 1 by the operation portion 11 to execute a job and then performs a logout operation, thereby performing the logout processing in the multi-functional peripheral 1 and the authentication server 2. The logout processing is also executed when the device controlling portion 10 detects that no operation has been made for a predetermined time after the job has ended or after the previous operation or when a login request is made from another user.

The multi-functional peripheral controlling portion 24 executes processing for updating the last usage function information in the last usage function management table 52 during the time from the display of the initial screen after logging in until immediately after logging out (step S9).

Therefore, the multi-functional peripheral 1 is provided with a function information transmission portion for transmitting to the authentication server 2 the usage function information indicating the usage function selected by the user operation during the time after login information is transmitted to the authentication server 2 and the user authentication processing is performed by the authentication server 2 until immediately after logging out. The function information transmission portion is able to be illustrated with the device controlling portion 10 and the communication portion 14. On the other hand, the authentication server 2 is provided with a function information reception portion for receiving from the multi-functional peripheral 1 the usage function information indicating the usage function selected by the user operation in the multi-functional peripheral 1 during the time after the user authentication processing is executed based on the login information received from the multi-functional peripheral 1 until immediately after logging out. The function information reception portion is able to be illustrated with the communication portion 20 and the multi-functional peripheral controlling portion 24.

In addition, the authentication server 2 is provided with the updating portion for updating the last usage function information corresponding to the login information based on the usage function information received at the function information reception portion. The updating portion is able to be illustrated with the multi-functional peripheral controlling portion 24 and the last usage function management table 52 of the user information management DB 26. The updating portion updates information indicating a screen used by the user as the last usage function information based on the login information not only for a screen for setting the function provided by the multi-functional peripheral itself but also for a screen for setting the function provided by the application server 3.

The update processing performed here is reflected on the initial screen display processing at the time of logging in next time by the same user. That is, the last usage function information updated at step S5 is read out and the last usage screen corresponding thereto is displayed at step S7.

Figure 12:
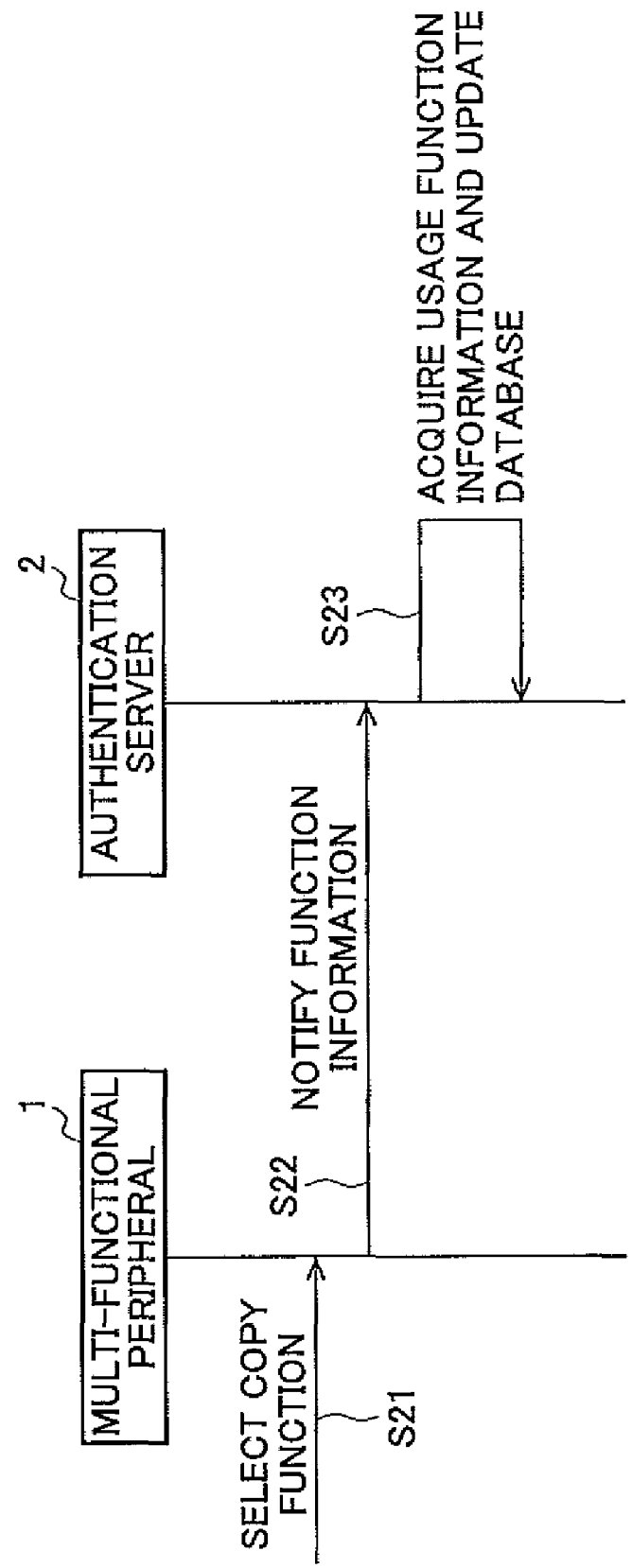
FIG. 12 is a diagram illustrating a first example of a sequence updating the last usage function management table of FIG. 7.

Out of the update processing of the last usage function management table 52 at step S9, an example of processing for performing the update when a screen (setting screen) of the elemental functions is selected and displayed will be described with reference to FIG. 12. FIG. 12 is a diagram illustrating a first example of a sequence updating the last usage function management table of FIG. 7 in the initial screen display processing of FIG. 2.

As an example when a screen (setting screen) of the elemental function is selected and displayed, an example when the copy screen 41 of FIG. 8 is selected and displayed is taken. When the copy screen 41 is selected by the input portion 11a by depressing a button on a copy execution screen to switch the screen (step S21), the device controlling portion 10 transmits information indicating the function used by the user, that is, information indicating the function of the copy screen 41 (elemental function) (referred to as function information) to the authentication server 2 (step S22). That is, the authentication server 2 is notified that the copy screen 41 is selected as the function information. The function information may be notified as device control information, but it may be configured such that information that the copy screen 41 is selected is transmitted as the operation panel information and is determined as the function information on the authentication server 2 sides. The multi-functional peripheral controlling portion 24 that has received the function information used by the user acquires the usage function information from the received function information and replaces with the last usage function information corresponding to the currently logged-in user ID in the last usage function management table 52 of the user information management DB 26 for updating (step S23).

Note that, the function information transmitted by the device controlling portion 10 may be configured to be usable as the usage function information as it is in the multi-functional peripheral controlling portion 24. Further, since existence of a user logged-in from other multi-functional peripheral is also able to be assumed, it is preferable that the function information includes a user ID and/or device information of the multi-functional peripheral 1.

Moreover, although the case where the copy screen 41 is selected has been illustrated, of course, when other screen is selected and displayed at step S21, function information of the screen is also notified at step S22. Note that, when logged out still in the screen displayed as the initial screen, for example, when the copy screen 41 is displayed as the initial screen, the last usage function already becomes the copy function, and therefore the notification at step S22 does not need to be performed. When the copy screen is selected again after other screen (the screen of other functions in the same category, in particular, such as the scanner function) is selected, the last usage function information has been already updated to the information indicating the function on the other screen, and therefore the notification is performed for updating again.

The update processing performed in this manner is reflected on the initial screen display processing at the time of logging in next time by the same user. As has been described for the initial screen display processing according to FIG. 2, the authentication server 2 customizes the initial screen after logging in depending on the function used at the time of logging out for each user so that even a display of the setting screen of the function of the multi-functional peripheral itself and even a display of the setting screen of the external application are able to be made by switching from the login screen.

Accordingly, the user does not need to switch the function of the multi-functional peripheral itself and the external application function and, after logging in, is able to access a setting screen in previous login easily. In this manner, according to the present invention, in the multi-functional peripheral 1 capable of performing user authentication processing in cooperation with the authentication server 2 and processing in cooperation with the application 32 stored in the external application server 3, since an initial screen is set so that a setting screen at the time of logging out serves as an initial screen at the time of logging in next time collectively, and therefore the user does not need to switch the screen of the function of the multi-functional peripheral itself and the screen of the external application function with each login and, immediately after logging in, is able to access a screen of the previously used function easily. For example, since it is possible to shift to a screen allowing an operation of the external application immediately after logging in the multi-functional peripheral, the operability is able to be enhanced.

Figure 13:
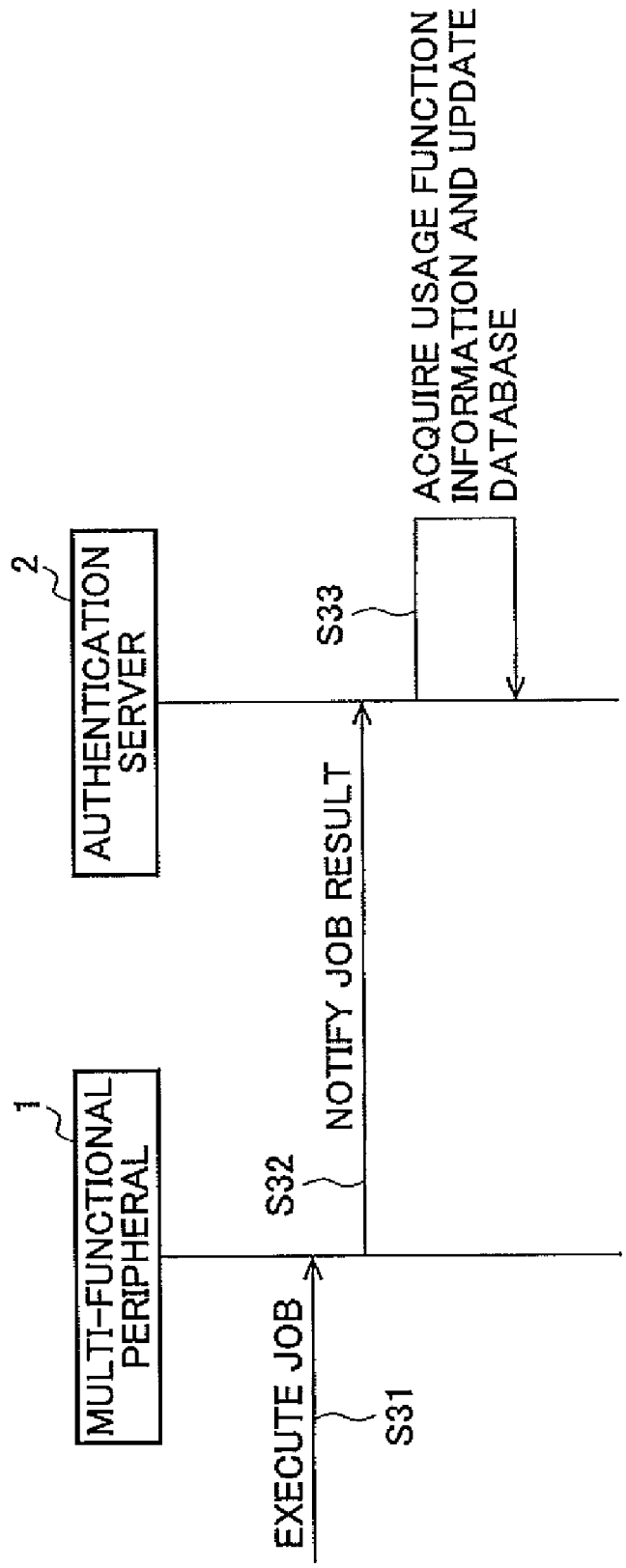
FIG. 13 is a diagram illustrating a second example of the sequence updating the last usage function management table of FIG. 7.
Figure 14:
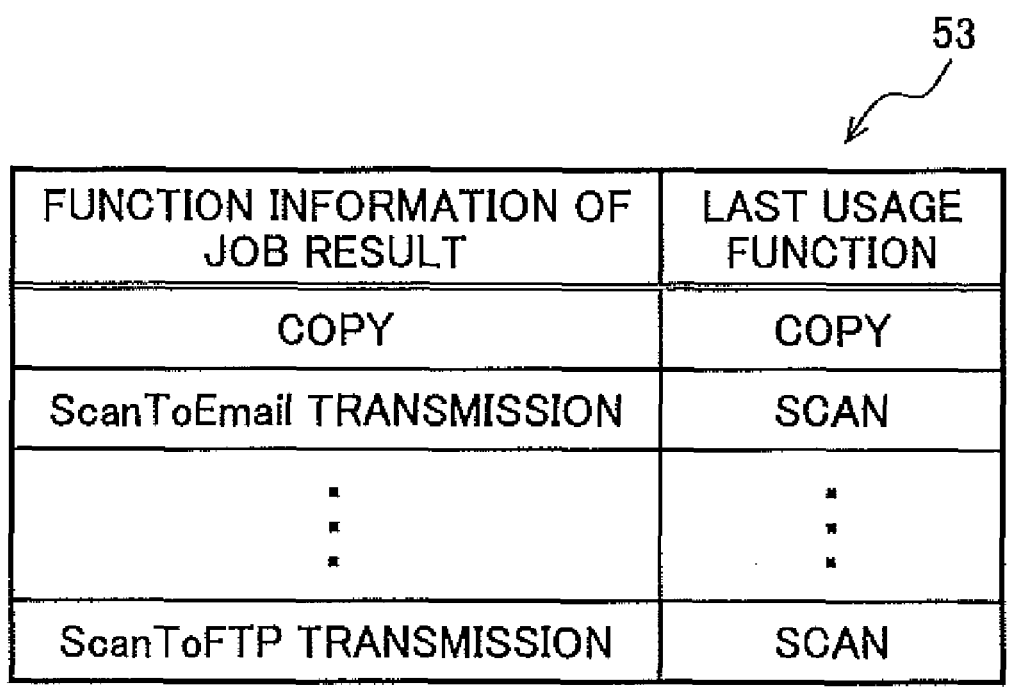
FIG. 14 is a diagram illustrating an example of a corresponding table of job functions and last usage functions used in the sequence of FIG. 13.

Next, description will be given for an example of processing for updating the last usage function management table which is applicable in place of the sequence example of FIG. 12 with reference to FIG. 13 and FIG. 14. FIG. 13 is a diagram illustrating a second example of the sequence updating the last usage function management table of FIG. 7 in the initial screen display processing of FIG. 2, and FIG. 14 is a diagram illustrating an example of a corresponding table of job functions and last usage functions used in the sequence of FIG. 13.

In this example, when a user actually uses a function of the multi-functional peripheral 1 to execute a job, the device controlling portion 10 detects execution of the job (step S31), and notifies detailed information to the executed job of the authentication server 2 as job result notification (step S32). That is, the above-described function information transmission portion transmits a job execution result executed by a user operation to the authentication server 2 as usage function information. The usage function information is transmitted as device control information.

The detailed information of a job mainly indicates the following information. In other words, execution user information, a model name of a multi-functional peripheral (MFP), a serial number of an MFP, an installation location of an MFP, a MAC address of an MFP, a network address of an MFP, identification ID of an execution job, types of jobs (copy, printing, ScanToEmail, ScanToFTP, etc.), start time/finish time, a document size, a double-sided setting, a color setting, staple information, punch information, a file format, a compression format, resolution, the total number of sheets (the number of transmitted sheets and the number of printed sheets), and the like, correspond to the detailed information of a job.

In this manner, since the job result notification includes information of executed functions, the multi-functional peripheral controlling portion 24 updates the last usage function management table 52 of the user information management DB 26 based on the notified information (step S33). In other words, the above-described function information reception portion of the authentication server 2 receives a job execution result executed by a user operation in the multi-functional peripheral 1 as usage function information, and the updating portion performs updating by indentifying last usage function information from the job execution result.

For such identification/update, the corresponding table 53 illustrated in FIG. 14 may be stored in the user information management DB 26. The corresponding table 53 is a corresponding table of executed function information included in a job result notification and last usage functions. For example, when a type of executed jobs is a copy, the last usage function is dealt with as a copy function. Additionally, when a type of executed jobs is the ScanToEmail transmission or the ScanToFTP transmission, those transmission are functions executable from a scan screen, and therefore, setting the last usage function to scan is performed. Same thing can be said of a fax function and a document management application XXX function.

In this manner, the authentication server 2 identifies a screen having the function from a job execution result. For example, when copy processing is executed by a user operation, based on a user ID of the user and a job result notification, last usage function information associated with the user ID is updated to a "copy function". Thereby, the copy screen 41 of FIG. 8 is displayed by the initial screen display processing when the same user logs in next time. Further, when an executed job is the ScanToEmail transmission or the ScanToFTP transmission, the scan screen 42 of FIG. 9 is displayed by the initial screen display processing when the same user logs in next time. Further, when an executed job is the fax transmission, the fax screen 43 of FIG. 10 is displayed by the initial screen display processing when the same user logs in next time. Additionally, when an executed job is the document management application XXX function, the document management application screen 44 of FIG. 11 is displayed by the initial screen display processing when the same user logs in next time.

Note that, in the case where an executed job is the ScanToEmail transmission or the ScanToFTP transmission, a scan function is selected as a last usage function, and as a result, an initial screen after logging in next time corresponds so as to transit to a representative page of scan transmission like the scan screen 42 of FIG. 9. However, when an Email setting page is able to be designated as an initial screen, the last usage function may be corresponded as a scan (Email setting) function. In other words, when a ScanToEmail transmission screen and a ScanToFTP transmission screen are separated due to a screen design, a ScanToEmail transmission function may be set in the case where a job type is the ScanToEmail transmission, and a ScanToFTP transmission function may be set in the case where a job type is the ScanToFTP transmission.

Then, processing at steps S31 and S32, that is, a job result notification based on job execution is transmitted to the authentication server 2 every time the job execution is completed, thereby the last usage function management table 52 always stores usage functions for the latest execution job as the last usage function information.

In the example of FIG. 12, updating of the last usage function management table 52 is performed only by performing simple screen switching despite execution of a job, while the last usage function management table 52 is updated with job information actually executed in FIG. 13, and therefore, higher accurate screen switching control is realized. Actually, when a screen that is finally executed is specified only by a screen operation, it is assumed that an unintended screen is displayed at the time of logging in next time in the case where a screen is switched by an erroneous operation of a user, however, the last usage function information is updated based on information of a job actually executed by the user so that use information of the user is able to be confirmed with higher accuracy. Additionally, such application is also possible that job history used by the user is analyzed and the highest usage function serves as a last usage function to configure the last usage function information, which becomes an initial screen after logging in.

Figure 15:
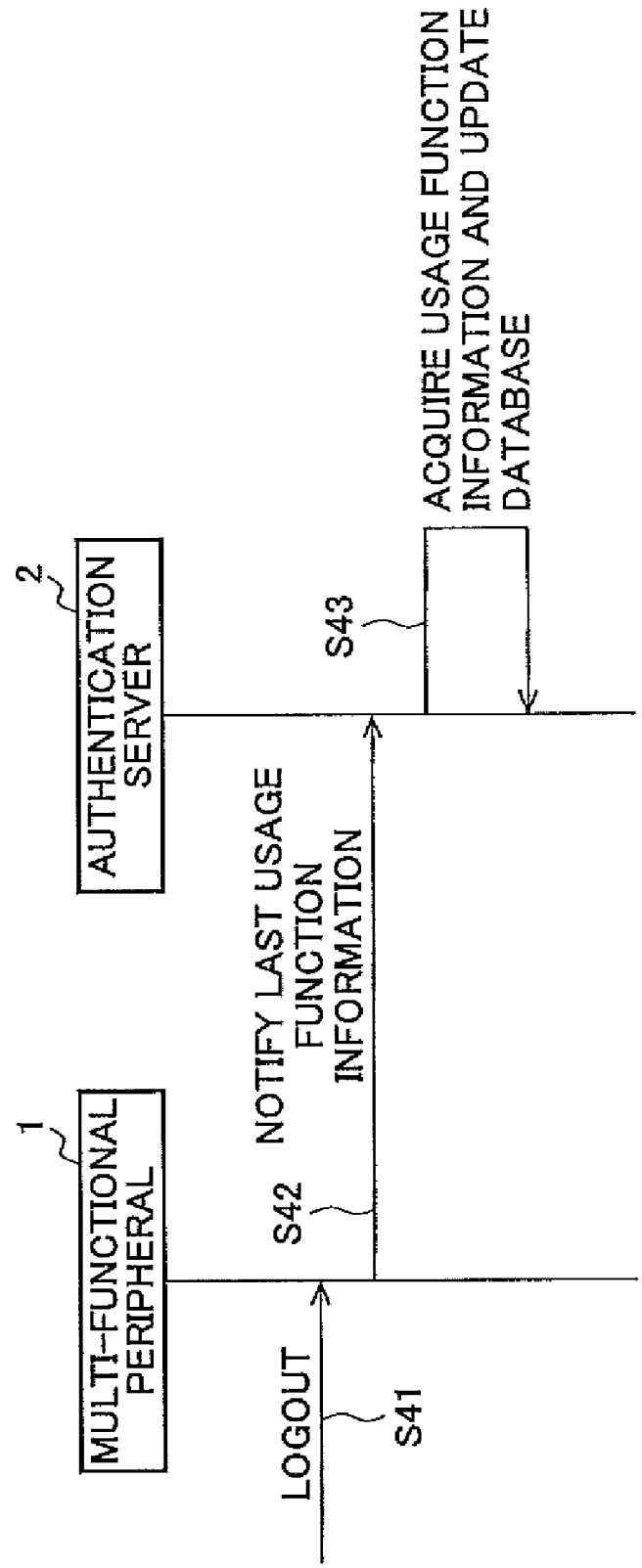
FIG. 15 is a diagram illustrating a third example of the sequence updating the last usage function management table of FIG. 7.

Next, description will be given for an example of processing for updating the last usage function management table that is applicable in place of sequence examples of FIG. 12 and FIG. 13 with reference to FIG. 15. FIG. 15 is a diagram illustrating a third example of the sequence updating the last usage function management table of FIG. 7 in the initial screen display processing of FIG. 2.

In this example, the device controlling portion 10 detects that logout processing is started (or completed) (step S41) to notify information of a usage function that is finally used before logging out (last usage function information) to the authentication server 2 (step S42). The last usage function information is notified as device control information. As described above, the device controlling portion 10 detects that a user performs a logout operation in the operation portion 11, or detects no operation has been made for a predetermined time after the job has ended or after the previous operation, or detects that a login request is made from another user, and logout processing is performed in the multi-functional peripheral 1 and the authentication server 2.

Then, the multi-functional peripheral control portion 24 of the authentication server 2 updates the last usage function management table 52 of the user information management DB 26 based on the notified last usage function information (step S33). By this update, for example, when a screen before logging out is the copy screen 41, the scan screen 42, the fax screen 43, and the document management application screen 44, a copy function, a scan function, a fax transmission function and the document management application XXX function are transmitted respectively to the authentication server 2 as the last usage function information, and screens of those functions are displayed as an initial screen at the time of logging in or after logging out next time.

In this way, it is also possible that at the timing of logging out from the multi-functional peripheral 1, the device controlling portion 10 of the multi-functional peripheral 1 performs a logout notification including final execution function information for the authentication server 2 and the logout notification is used in place of the notification in FIG. 12 or FIG. 13.

Next, description will be given for an example of a table that is able to be used in place of the last usage function management table 52 of FIG. 7 with reference to FIG. 16. FIG. 16 is a diagram illustrating an example of the last usage function management table managed by the user information management DB of the authentication server in the system of FIG. 1.

The last usage function management table 54 of FIG. 16 stores the number of use of each elemental function for each of user IDs, as well as stores for each of user IDs a display priority degree concerning a final use screen (screen of a last usage function) to be displayed as an initial screen at the time of logging in next time.

In the last usage function management table 54, for a user ID "2", the number of use by elemental function is updated per use to be stored, a first priority screen and a second priority screen are determined on the basis of the number of use to be stored, and thereby an initial screen at the time of logging in next time is able to be designated. In this example, for the user ID "2", the first priority screen is stored as a copy screen, and the second priority screen is stored as a fax screen.

Explaining more specifically, for acquiring the number of use, any methods for acquiring usage functions of FIG. 12, FIG. 13 and FIG. 15 may be employed. Further, when only the number of use is grounded in, the first priority screen must be a scan screen, and the first priority screen must be a copy screen, however, since with reference to the function valid/ invalid management table 51 of FIG. 6, it is detected that authorization of the scan function of the user ID "2" is invalid, for which a user is not able to use even in the case of designating as an initial screen, it is necessary to switch to a screen on which other function is selected even with the first priority screen as it is. Therefore, in the last usage function management table 54, the scan screen is deleted from the first priority screen, and the copy screen in a second place serves as the first priority screen.

Additionally, here, although giving an example in the last usage function management table 54 where the number of use of a scan function becomes 12 times and a user whose user ID is "2" uses the scan function, such result is occurred when the scan function for the user ID "2" in the function valid/invalid management table 51 is changed from "valid" to "invalid" by an administrator user after using the scan function 12 times.

Further, a reason for providing the second priority screen is also given with the assumption that the first priority screen is unavailable for the user due to other facts (for example, excess of the number of use, etc.), and thereby the usability is not impaired.

In this way, the final information transmission portion of the authentication server 2, when a last usage function indicated by the updated last usage function information is a usage function that is set as being unavailable for a user in the multi-functional peripheral 1 who is indicated by login information at the time of transmission of the last usage function information, transmits the last usage function information indicating other last usage functions. Since, at least, determination may be made whether or not a usage function is unavailable at the time of transmitting the last usage function information, a screen on which a usage function that is already unavailable is omitted may be registered as the first priority screen and the second priority screen at the time of updating like the last usage function management table 54.

Further, explaining collectively for a usage function that is set as being unavailable, it is determined as being unavailable in the case where the administrator user directly changed to invalidation, and it is also determined in the case of prohibition of use since the number of used sheets reaches the limitation. Further, as the above-described other last usage function, the usage function with the next high use is illustrated, but may be simply a function related to a specific screen to be an initial screen may be allowed. To be more specific, while a specific function that is determined in advance (for example, a copy function) is set, when the function that is determined in advance is unavailable, a specific function that is determined in advance as a next priority order (for example, a scan function) may be set.

In addition, in the above-described various examples, only by selecting either a function of the multi-functional peripheral itself is selected or an external application function is selected in the previous login, information of a last usage function may be described, and in such case, an initial screen of the multi-functional peripheral 1, or a login screen to the application server 3 or a selected screen of the application 32 is displayed by the display portion 11*b*.

Further, description has been made for the processing for displaying an initial screen after logging in of the present invention assuming that the elemental function that valid/invalid information is determined in the function valid/invalid management table 51 and a usage function including a last usage function are corresponded. However, these functions may be classified into different categories, except the example related to invalidation of the functions explained in FIG. 16. Actually, validation/invalidation of the elemental functions for the multi-functional peripheral 1, the selection of an screen after logging in based on the last usage function and the instruction for the multi-functional peripheral 1 may be executed as independent control except the example related to invalidation of the functions explained in FIG. 16.

In the above-described various examples, an initial screen at the time of logging in next time is determined only based on the functions executed in the multi-functional peripheral 1, however, in addition to such determining/display processing of an initial screen, a setting value before logging in corresponding to the function of a screen to be displayed as the initial screen may be reflected on the multi-functional peripheral 1. As the setting value, various setting values such as a color mode, copy density, scan resolution, variable magnification, and the settings in an external application are included.

Description will be given for a configuration example therefore. The function information transmission portion of the multi-functional peripheral 1 transmits, together with use function information, a setting value that is a setting value of a function indicated by usage function information and that has been set by a user operation until immediately after logging out since user authentication processing has been performed (for example, a setting value that has been set in a setting screen at the time of the previous log-off), to the authentication server 2.

The function information reception portion of the authentication server 2 receives the setting value together with the usage function information, and the updating portion updates the last usage function information including even the setting value corresponding to login information, based on the usage function information and the setting value that are received. Then, the final information transmission portion of the authentication server 2 transmits the last usage function information including even the setting value to the multi-functional peripheral 1.

The last information reception portion of the multifunctional peripheral 1 receives the setting value as a part of the last usage function information. The multi-functional peripheral 1 is provided with a setting value reflection portion as follows. The setting value reflection portion reflects the setting value received at the last information reception portion when the display controlling portion displays the initial screen after logging in. Here, the display controlling portion, in the case where a screen that a setting value is already set is different from a screen corresponding to the final function use information (excluding the setting value), may display the screen that the setting value is already set as the initial screen after logging in.

In this way, setting values of scan solution etc., that have been set on a setting screen at the time of the previous log-off are stored to be set at the time of logging in next time so that it is possible to save the setting work.

Further, although giving an example in which the authentication server 2 stores a setting value, the multi-functional peripheral 1 itself may store the setting value for the time of logging in next time. Therefore, the multi-functional peripheral 1 may be provided with a setting value storage portion and a setting value reflection portion as follows.

The setting value storage portion, when usage function information is transmitted in the function information transmission portion, stores a setting value that is a setting value of a function indicated by the usage function information and that has been set by a user operation until immediately after logging out since user authentication processing has been made. The setting value may be stored in association with login information. The setting value reflection portion reflects a setting value that is stored in the setting value storage portion when the display controlling portion displays an initial screen after logging in. Also here, the display controlling portion, when a screen that a setting value is already set is different from a screen corresponding to the final function use information (excluding the setting value), may display the screen that the setting value is already set as the initial screen after logging in. Note that, in this example, since reading of the setting value is not involved in the side of the authentication server 2, it is only needed that processing for an initial screen is possible.

Further, in the above-described various examples, as having mentioned concerning other multi-functional peripherals having the same functions as the multi-functional peripheral 1 in the present invention, a plurality of multi-functional peripherals may be connected to a system. Simple description will be given for such an example with reference to FIG. 17.

Figure 17:
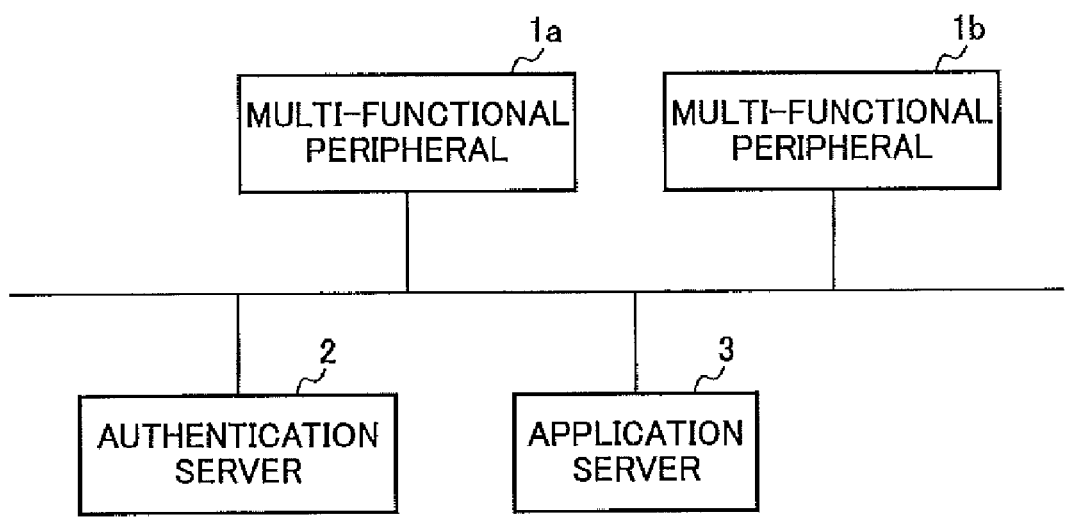
FIG. 17 is a diagram illustrating another schematic configuration example of the system including the multi-functional peripheral according to the present invention.

FIG. 17 is a diagram illustrating another schematic configuration example of the system including multi-functional peripherals according to the present invention. The system shown in FIG. 17 is configured with two multi-functional peripherals 1a and 1b that are equal to the above-described multi-functional peripheral 1, the authentication server 2 and the external application server 3 connected to a network. Note that, the number of the multi-functional peripherals are not limited to two, and the following explanation is also applicable even when three or more are connected to the network.

In this example, it is assumed that identification information that has been already explained is transmitted. In other words, a function information transmission portion of the multi-functional peripheral 1a (1b) transmits identification information for identifying the multi-functional peripheral 1a (1b) to the authentication server 2, together with the usage function information. In the function information transmission portion of the multi-functional peripheral 1a and the function information transmission portion of the multi-functional peripheral 1b, different identification information will be transmitted.

The function information reception portion of the authentication sever 2 receives identification information from the multi-functional peripheral 1a (1b), together with the usage function information. The updating portion updates the last usage function information corresponding to login information and identification information based on the usage function information and the identification information that were received. In FIG. 5 to FIG. 7 and FIG. 16, one user management table 50, one function valid/invalid table 51, one last usage function table 52 and one last usage function table were only explained, assuming one multi-functional peripheral 1, however, in the case of applying to the system illustrated in FIG. 17, management may be performed so as to discriminate with each identification information of the multi-functional peripherals in each of the tables 50 to 52 and 54.

For example, the configuration example of FIG. 17 may be configured to refer to a different user management table 50 corresponding to different multi-functional peripherals 1a and 1b. A user management table corresponding to the multi-functional peripheral 1a may be selected, in the case where device information that is transmitted indicates the multi-functional peripheral 1a, and a user management table corresponding to the multi-functional peripheral 1b may be selected, in the case where the device information that is transmitted indicates the multi-functional peripheral 1b different from the multi-functional peripheral 1a. Then, when referring to the user management table corresponding to the multi-functional peripheral 1a, it may be decided to refer to each of the tables 51 and 52 (54) corresponding to the multi-functional peripheral 1a, and when referring to the user management table corresponding to the multi-functional peripheral 1b, it may be decided to refer to each of the tables 51 and 52 (54) corresponding to the multi-functional peripheral 1b. As another example, it may be configured such that the user management table 50 is common with the multi-functional peripherals 1a and 1b and respective tables 51 and 52 (54) corresponding to identification information of the multi-functional peripheral 1a and respective tables 51 and 52 (54) corresponding to identification information of the multi-functional peripheral 1b are provided.

Then, after the user authentication processing is made, the final information transmission portion of the authentication server 2 transmits the last usage function information corresponding to the identification information of the multi-functional peripheral 1a (1b) in which the user authentication processing has been made to the multi-functional peripheral 1a (1b).

The last information reception portion of the multi-functional peripheral 1a (1b) receives the last usage function information that has been already updated by the authentication server 2 based on the usage function information transmitted at the time of previous login, and is associated with the identification information of the multi-functional peripheral 1a (1b) itself from the authentication server 2 after the user authentication processing is made. Thereby, the display controlling portion of the multi-functional peripheral 1a (1b) displays an initial screen suitable for the multi-functional peripheral 1a (1b).

In this way, the usage function information at the time of logging off for each of multi-functional peripherals are stored in the authentication server 2 so that a login initial screen corresponding to each of multi-functional peripherals is displayed according to a multi-functional peripheral which is logged in, and it is thus possible to display a suitable login initial screen for each of multi-functional peripherals when a user separately uses a plurality of multi-functional peripherals according to a purpose of use.

In addition, as a method for causing a plurality of multi-functional peripherals to be corresponded, processing is not separately performed for each of multi-functional peripherals as described above, but the following processing may be performed.

That is, in the case where a function corresponding to a characteristic of an application, which is to say, a function that is needed to be used together with a function of an application (a function in a function of the multi-functional peripheral itself) is coincident between a multi-functional peripheral at the time of previously logging out and a multi-functional peripheral at the time of logging in this time, a multi-functional peripheral may display a screen when the user previously logs out. In the authentication server, when a function of a multi-functional peripheral corresponding to a characteristic of an application is coincident between a multi-functional peripheral at the time of previously logging out and a multi-functional peripheral at the time of logging in this time, the last usage function information may be transmitted.

Description will be given for a specific configuration example for performing such processing. First, the function information transmission portion of the multi-functional peripheral transmits necessary function information to the authentication server together with the usage function information, when a usage function selected by a user operation indicates a function of an application, and when a function executed by the multi-functional peripheral itself needs to be used together with an application. The necessary function information serves as information indicating a function that is needed to be used together with an application thereof.

Then, in the authentication server, the function information reception portion receives the necessary function information from the multi-functional peripheral together with the usage function information, and the updating portion updates the last usage function information corresponding to login information based on the received usage function information as well as stores the last usage function information in relation to the received necessary function information. Further, in the authentication server, the final information transmission portion transmits the last usage function information that has been already updated by the updating portion to a multi-functional peripheral for displaying an initial screen after logging in, after the user authentication processing is made and when it is determined that a function indicated by the necessary function information in relation to the last usage function information is a function provided in the multi-functional peripheral. On the other hand, when it is determined that a function indicated by the necessary function information is the function not provided in the multi-functional peripheral, the final information transmission portion transmits an instruction to display a default screen of the multi-functional peripheral to the multi-functional peripheral in place of the last usage function information that has been already updated by the updating portion. Note that, it may be configured such that the identification information of the multi-functional peripheral is transmitted together with the usage function information, such determination is executed only when there is no coincidence comparing to the identification information at the time of logging in next time, that is, only when the multi-functional peripheral at the time of previously logging out is different from the multi-functional peripheral at the time of logging in this time.

In the multi-functional peripheral, the last information reception portion receives the last usage functional information or an instruction to display a default screen. In other words, the last information reception portion receives the last usage function information that has been already updated in relation to the necessary function information in the authentication server based on the usage function information and the necessary function information that are transmitted from the multi-functional peripheral or other multi-functional peripheral at the time of previously logging in after the user authentication processing is made and when it is determined that a function indicated by the necessary function information is a function provided in the multi-functional peripheral. On the other hand, when it is determined that the function that is indicated by the necessary function information is a function not provided in the multi-functional peripheral, an instruction to display a default screen of the multi-functional peripheral is received from the authentication server in place of the updated last usage function information. Then, the display controlling portion displays a screen corresponding to the last usage function information received at the last information reception portion or a default screen according to the instruction received at the last information reception portion as the initial screen after logging in.

Description will be given more specifically as an example for a case where an application selected by a user in the multi-functional peripheral 1a is a scan application (for example, an application for transmitting scan data to a specified document management server).

At the time of logging out after using a scan application in the multi-functional peripheral 1a, the usage function information (information indicating the scan application) is transmitted to the authentication server 2, and at the same time, scanner function information indicating a scanner function of the multi-functional peripheral 1a that is used together with the application as the necessary function information (for example, possible/impossible of color reading, types of resolution, information indicating possible/impossible of double-sided reading, etc.) is transmitted to the authentication server 2. In the authentication server 2, usage function information at the time of logging out and the scanner function information are acquired at the same time and stored, relating the last usage function information to the scanner function information.

The authentication server 2, when the same user logs in from the multi-functional peripheral 1b next time, acquires information of a function that is needed to be used together with the scan application (scanner function information) from the multi-functional peripheral 1b on the basis that the usage function information at the time of previously logging out (that is, last usage function information) indicates a scan application. According to requirement of the function information from the authentication server 2, the multi-functional peripheral 1b transmits the function information. Note that, transmitting/receiving of such information (scanner function information) is not needed in the case where information of a function provided in the multi-functional peripheral 1b has already been managed in the authentication server 2. Next, the authentication server 2 checks whether or not the scanner function information of the multi-functional peripheral 1a that is stored is coincident with the scanner function information of the multi-functional peripheral 1b, and in the case of coincidence, instructs the multi-functional peripheral 1b to display a screen corresponding to the last usage function information at the time of previously logging out (in this example, a screen of the scan application), and in the case of no coincidence, instructs the multi-functional peripheral 1b to display a standard screen of the multi-functional 1b.

With this configuration, when using the scan application in the multi-functional peripheral 1a and logging out and then next time logging in the multi-functional peripheral 1b which is a different multi-functional peripheral, if a function which is same as a function used together with the scan application is present also in the logged-in multi-functional peripheral 1b, a previous function is operated, and it is possible to prohibit the previous function from operating when the function is different. Note that, as described above, it may be configured such that identification information of the multi-functional peripheral is transmitted together with the usage function information and is compared to the identification information at the time of logging in next time, and such determination whether or not it is present is performed only in the case of no coincidence.

For example, when functions are different between the multi-functional peripheral 1a and the multi-functional peripheral 1b, in the case where a user always uses a color scan in the multi-functional peripheral 1a and in the case where the multi-functional peripheral 1b is provided only with a function of monochrome scan, the user believes that a scanner function that is same as that of the multi-functional peripheral 1a, that is, color scan, is available when a setting screen of the scan application is activated right after logging in the multi-functional peripheral 1b, and will notice later that color scan is not available, which thus causes stress for the user. However, since, with this configuration, the previous screen is activated only in the case of having the same function, it is possible to reduce stress of a user by noticing after activation that there is no such function.

Figure 18:
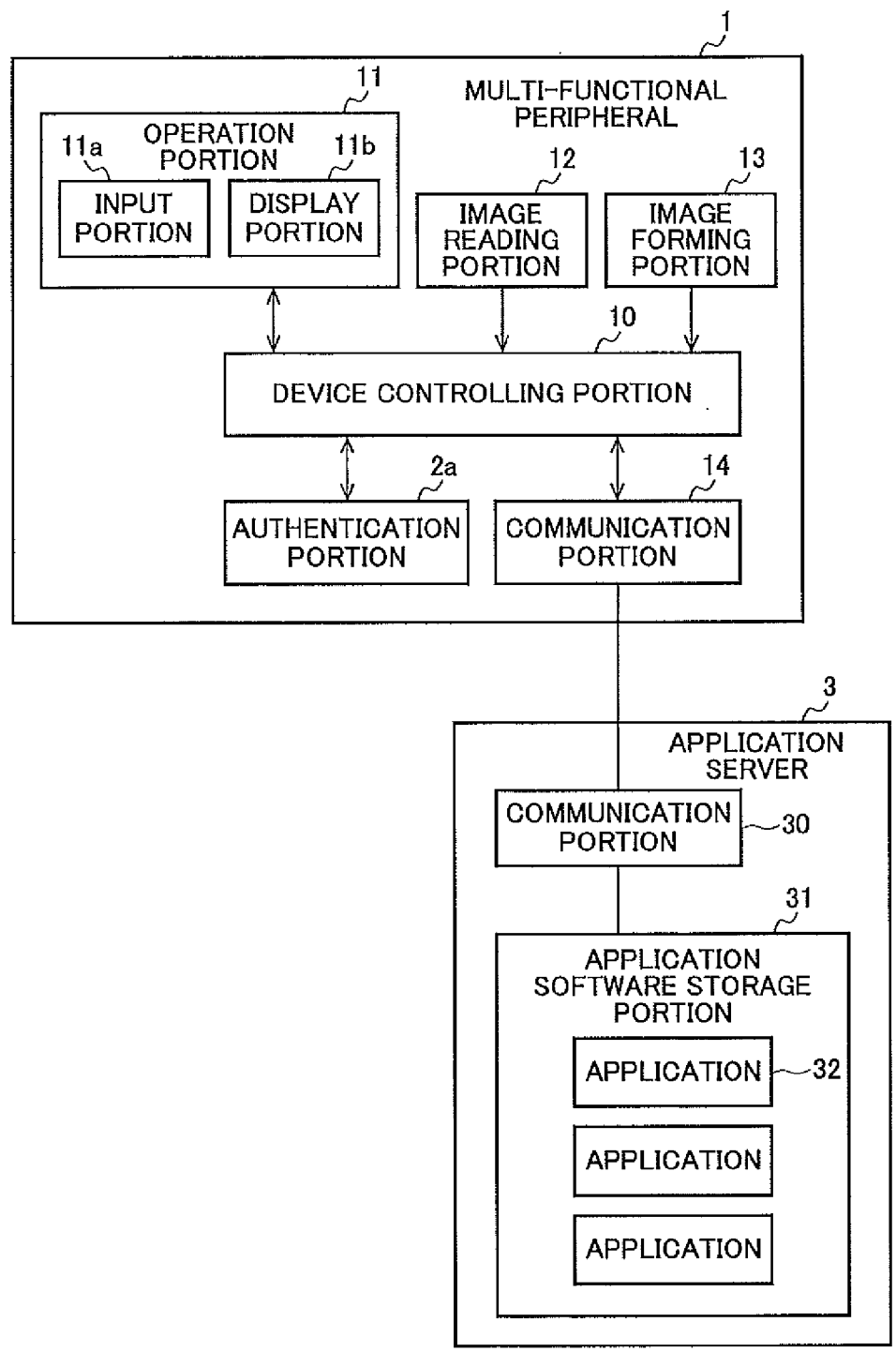
FIG. 18 is a block diagram illustrating another schematic configuration example of the system including the multi-functional peripheral according to the present invention.

Further, in the above-described various examples, functions of the authentication server 2 may be configured so as to be included inside of the multi-functional peripheral 1 (1a, 1b). FIG. 18 is a block diagram showing another schematic configuration example of the system including the multi-functional peripheral according to the present invention. The system shown in FIG. 18 is provided with the multi-functional peripheral 1 and the application server 3, and functions of the authentication server 2 shown in FIG. 1 are incorporated into the multi-functional peripheral 1 as an authentication portion 2a. In this example, since the authentication server function is not needed to be provided in the outside of the multi-functional peripheral 1 separately, the multi-functional peripheral 1 may only be kept connecting to the application server 3, and authentication processing is able to be performed alone to be convenient for a small-sized office, and the like. Note that, when a function corresponding to a characteristic of an application is coincident between a multi-functional peripheral at the time of previously logging out and a multi-functional peripheral at the time of logging in this time, it is also applicable in the form for displaying a screen when the user previously logs out, for example, by providing the authentication portion 2a in the multi-functional peripheral 1a so that other multi-functional peripheral such as the multi-functional peripheral 1b performs authentication in the authentication portion 2a.

Additionally, the present invention may employ a form as a system provided with a multi-functional peripheral, an authentication server and an application server in the above-described each example. Description will be simply given for main characteristics of this system. This system is a system provided with an authentication server, an application server that stores an application, and a multi-functional peripheral including a display portion capable of performing user authentication processing via the authentication server and processing in cooperation with the application. The multi-functional peripheral is connected to the application server and the authentication server. Then, this system, after login information is transmitted from the multi-functional peripheral to the authentication server and the user authentication processing is made in the authentication server until logging out, stores usage function information indicating a usage function selected by a user operation as last usage function information, and causes a display portion to display a screen corresponding to the last usage function information as an initial screen after logging in next time. Note that, the other applied examples in this system are as described above.

According to the present invention, in a multi-functional peripheral capable of performing user authentication processing in cooperation with the authentication server and processing in cooperation with an application stored in an external application server, a user does not need to switch a screen of a function of the multi-functional peripheral itself and a screen of the external application function every time logging in, and is able to easily access a screen of a function that was previously used right after logging in.

The invention claimed is:

1. A multi-functional peripheral connected to an authentication server and an application server, capable of performing user authentication processing via the authentication server and capable of performing processing in cooperation with an application program stored in the application server, comprising:
a function information transmission portion for transmitting to the authentication server usage function information indicating a usage function selected by a user operation during time after login information is transmitted to the authentication server and the user authentication processing is performed by the authentication server until immediately after logout;
a last information reception portion for receiving from the authentication server last usage function information that has been updated by the authentication server based on the usage function information transmitted in previous login after the user authentication processing is performed; and
a display controlling portion for displaying a screen corresponding to the last usage function information received at the last information reception portion as an initial screen after logging in, wherein
the function information transmission portion, when a usage function selected by a user operation indicates a function of the application program and it is necessary to use a function executed by the multi-functional peripheral itself with the application program, transmits together with the usage function information necessary function information indicating the function needed to be used with the application program,
the last information reception portion, when the authentication server determines that a function indicated by the necessary function information is a function provided in the multi-functional peripheral, receives from the authentication server last usage function information that has been updated in association with the necessary function information by the authentication server based on the usage function information and the necessary function information transmitted from the multi-functional peripheral or other multi-functional peripheral in previous login after the user authentication processing is performed, and when the authentication server determines that the function indicated by the necessary function information is a function not provided in the multi-functional peripheral, receives from the authentication server an instruction to display a default screen of the multi-functional peripheral instead of the last usage function information that has been updated, and
the display controlling portion displays a screen corresponding to the last usage function information received at the last information reception portion or the default screen in accordance with an instruction received at the last information reception portion as an initial screen after logging in.

2. The multi-functional peripheral as defined in claim 1, wherein
the function information transmission portion transmits an execution result of a job executed by the user operation to the authentication server as the usage function information.

3. The multi-functional peripheral as defined in claim 1, wherein
the function information transmission portion transmits, together with the usage function information, a setting value that is a setting value of a function indicated by the usage function information and that has been set by a user operation during the time after the user authentication processing is performed until immediately after logout to the authentication server,
the last information reception portion receives the setting value as a part of the last usage function information, and
the multi-functional peripheral further includes a setting value reflection portion for, when the display controlling portion displays the initial screen after logging in, reflecting the setting value received at the last information reception portion.

4. The multi-functional peripheral as defined in claim 1, further comprising:
- a setting value storage portion for, when the function information transmission portion transmits the usage function information, storing a setting value that is a setting value of a function indicated by the usage function information and that has been set by a user operation during the time after the user authentication processing is performed until immediately after logout; and
- a setting value reflection portion for, when the display controlling portion displays the initial screen after logging in, reflecting the setting value stored in the setting value storage portion.

5. A system comprising the multi-functional peripheral as defined in claim 1, the authentication server, and an application server connected to the multi-functional peripheral and the authentication server and having the application program stored therein.

6. A multi-functional peripheral connected to an authentication server and an application server, capable of performing user authentication processing via the authentication server and capable of performing processing in cooperation with an application program stored in the application server, comprising:
- a function information transmission portion for transmitting to the authentication server usage function information indicating a usage function selected by a user operation during time after login information is transmitted to the authentication server and the user authentication processing is performed by the authentication server until immediately after logout;
- a last information reception portion for receiving from the authentication server last usage function information that has been updated by the authentication server based on the usage function information transmitted in previous login after the user authentication processing is performed; and
- a display controlling portion for displaying a screen corresponding to the last usage function information received at the last information reception portion as an initial screen after logging in, wherein
- the last information reception portion, when a last usage function indicated by the last usage function information that has been updated by the authentication server indicates a function of the application program, receives an instruction to display a display screen of the last usage function from the authentication server, and the display controlling portion acquires data of the display screen of the last usage function from the application server based on the instruction to display the display screen as an initial screen after logging in, and
- the last information reception portion, when the last usage function indicated by the last usage function information that has been updated by the authentication server indicates a function executed by the multi-functional peripheral itself, receives an instruction to display a display screen of the last usage function from the authentication server, and the display controlling portion displays the display screen of the last usage function based on the instruction as an initial screen after logging in.

7. The multi-functional peripheral as defined in claim 6, wherein
the function information transmission portion transmits, together with the usage function information, identification information for identifying the multi-functional peripheral to the authentication server, and
the last information reception portion receives from the authentication server last usage function information that is last usage function information that has been updated by the authentication server based on the usage function information transmitted in previous login and that is associated with the identification information of the multi-functional peripheral itself after the user authentication processing is performed.

8. A system comprising the multi-functional peripheral as defined in claim 6, the authentication server, and an application server connected to the multi-functional peripheral and the authentication server and having the application program stored therein.

9. An authentication server connected to a multi-functional peripheral and performing user authentication processing in the multi-functional peripheral, the multi-functional peripheral being connected to an application server and being capable of performing processing in cooperation with an application program stored in the application server, and the authentication server, comprising:
- a function information reception portion for receiving from the multi-functional peripheral usage function information indicating a usage function selected by a user operation in the multi-functional peripheral during time after the user authentication processing is executed based on login information received from the multi-functional peripheral until immediately after logout;
- an updating portion for updating last usage function information corresponding to the login information based on the usage function information received at the function information reception portion; and
- a last information transmission portion for transmitting to the multi-functional peripheral the last usage function information that has been updated by the updating portion after the user authentication is performed in order to display an initial screen after logging in, wherein
- the function information reception portion, when a usage function selected by a user operation in the multi-functional peripheral indicates a function of the application program and it is necessary to use a function executed by the multi-functional peripheral itself with the application program, receives from the multi-functional peripheral, together with the usage function information, necessary function information indicating the function needed to be used with the application program,
- the updating portion updates last usage function information corresponding to the login information based on the usage function information received at the function information reception portion and associates the necessary function information received at the function information reception portion with the last usage function information, and
- the last information transmission portion, after the user authentication processing is performed and it is determined that a function indicated by the necessary function information associated with the last usage function information is a function provided in the multi-functional peripheral, transmits to the multi-functional peripheral the last usage function information that has been updated by the updating portion, and when it is determined that the function indicated by the necessary function information is a function not provided in the multi-functional peripheral, transmits to the multi-functional peripheral an instruction to display a default screen of the multi-functional peripheral instead of the last usage function information that has been updated by the updating portion.

10. The authentication server as defined in claim 9, wherein the last information transmission portion transmits to the multi-functional peripheral an instruction to display a display screen of the last usage function as the initial screen after logging in as the last usage function information that has been updated by the updating portion.

11. The authentication server as defined in claim 9, wherein the function information reception portion receives an execution result of a job executed by a user operation in the multi-functional peripheral as the usage function information and the updating portion specifies the last usage function information from the execution result of the job for updating.

12. The authentication server as defined in claim 9, wherein the last information transmission portion, when a last usage function indicated by the last usage function information that has been updated by the updating portion is a usage function that is set to be unavailable in the multi-functional peripheral for a user indicated by the login information in transmission of the last usage function information, transmits last usage function information indicating other last usage function.

13. The authentication server as defined in claim 9, wherein the function information reception portion receives from the multi-functional peripheral, together with the usage function information, a setting value that is a setting value of a function indicated by the usage function information and that has been set by a user operation during the time after the user authentication processing is performed until immediately after logout,
the updating portion updates last usage function information including the setting value corresponding to the login information based on the usage function information and the setting value received at the function information reception portion, and
the last information transmission portion transmits to the multi-functional peripheral the last usage function information including the setting value.

14. The authentication server as defined in claim 9, wherein the function information reception portion receives, together with the usage function information, identification information for identifying the multi-functional peripheral,
the updating portion updates last usage function information corresponding to the login information and the identification information based on the usage function information and the identification information received at the function information reception portion, and
the last information transmission portion transmits to the multi-functional peripheral the last usage function information corresponding to the identification information of the multi-functional peripheral subjected to the user authentication processing after the user authentication processing is performed.

* * * * *